United States Patent [19]
Engbersen et al.

[11] Patent Number: 5,271,000
[45] Date of Patent: Dec. 14, 1993

[54] METHOD AND APPARATUS FOR TESTING AND EVALUATION OF DISTRIBUTED NETWORKS

[75] Inventors: Antonius J. Engbersen, Richterswil; Marco Heddes, Kilchberg; Andreas Herkersdorf, Adliswil; Ronald Luijten, Oberrieden; Ernst Rothauser, Reichenburg, all of Switzerland

[73] Assignee: International Business Machines Corporation, Armonk, N.Y.

[21] Appl. No.: 804,133

[22] Filed: Dec. 6, 1991

[30] Foreign Application Priority Data

Mar. 22, 1991 [EP] European Pat. Off. ........ 91810203.9

[51] Int. Cl.$^5$ .............................................. H04L 1/24
[52] U.S. Cl. ....................................... 370/13; 370/17; 371/20.1
[58] Field of Search ............... 371/20.1, 25.1, 15.1; 370/13, 14, 16, 17, 60, 60.1, 94.1, 94.2, 85.6

[56] References Cited

U.S. PATENT DOCUMENTS

| | | | |
|---|---|---|---|
| 4,486,877 | 12/1984 | Turner | 370/15 |
| 4,542,507 | 9/1985 | Read | 371/20.1 |
| 4,617,663 | 10/1986 | Lake et al. | 371/25 |
| 4,679,186 | 7/1987 | Lea | 370/14 |
| 4,730,313 | 3/1988 | Stephenson et al. | 370/17 |
| 4,745,593 | 5/1988 | Stewart | 370/15 |
| 4,937,825 | 6/1990 | Ballard et al. | 371/20.1 |
| 5,008,878 | 4/1991 | Ahmadi et al. | 370/94.3 |
| 5,027,343 | 6/1991 | Chan et al. | 371/20.1 |
| 5,208,803 | 5/1993 | Conforti et al. | 370/17 X |

Primary Examiner—Douglas W. Olms
Assistant Examiner—Melvin Marcelo
Attorney, Agent, or Firm—Edward H. Duffield

[57] ABSTRACT

The dynamic functional behavior of geographically distributed fast packet switching systems, including those which accommodate high-priority circuit switched traffic and low-priority packet switched traffic, are tested in real-time by sending test packets from one or more source nodes through the system to specific destinations that comprise a test packet analyzer. The test packets have the same structure as the data packets, but in their payload portion carry the entire information required to perform the testing. The nature of that test information depends on the characteristics of a set of predefined system errors the verification system is supposed to identify. For detecting errors, the test information would include an input address indicating the source of the test packet, a sequence number defining the order in which the packet should arrive at the destination, time bits relating to the packet length and/or to the expected packet transmission delay, and a cyclic redundancy code which covers the entire contents of the test packet, including its control portion. Each analyzer at a receiving station operates autonomously from the senders and processes all received traffic in real-time; this enables it to recognize all defined system errors, even those occurring with very low probability, at the packet level.

13 Claims, 14 Drawing Sheets

FIG. 3
PRIOR ART
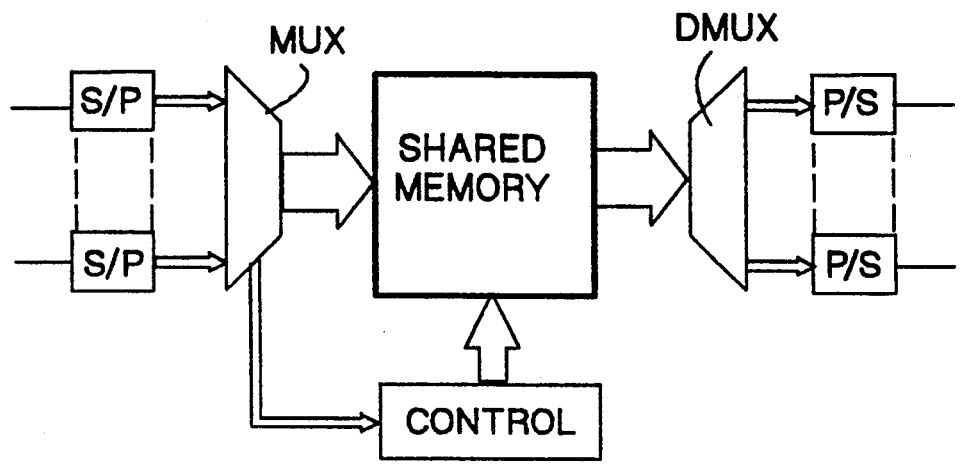
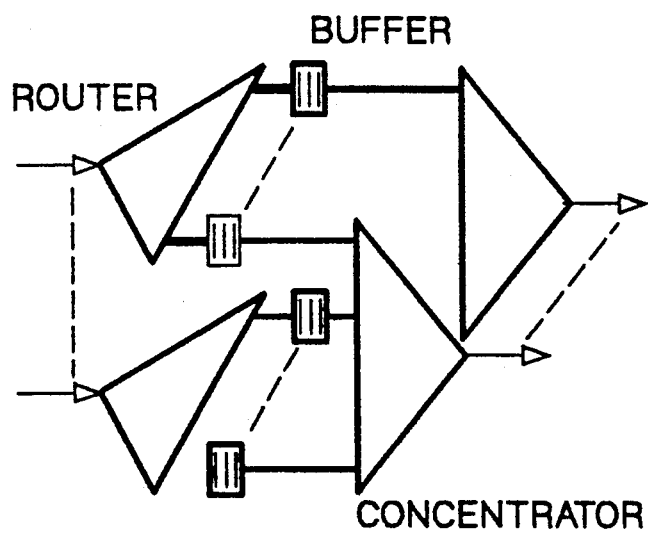
FIG. 4
PRIOR ART

METHOD AND APPARATUS FOR TESTING AND EVALUATION OF DISTRIBUTED NETWORKS

FIELD OF INVENTION

This invention relates to a method and an apparatus for the testing and evaluation of the dynamic functional behavior of geographically distributed high-performance telecommunication networks, in particular fast packet switching systems, under real-time operating conditions. The inventive teaching enables the detection of transient system errors with occurrence probabilities even below $10^{-9}$.

PRIOR ART

The natural approach to test any system for correctness is to compare its output results with the corresponding results of an error-free "golden" system which operates under identical conditions. The need for the "golden" system and the assurance that it actually works free of errors are the inherent problems of this approach. Another general solution is to compare the results of the system under test with precalculated lookup tables. The complexity of present-day telecommunication networks and the speed with which they are expected to perform disqualify this solution because of the size of the necessary lookup tables and the time they require for the comparison.

Since there exists no satisfactory solution to test sequential circuits in general, it is believed that test approaches that are restricted to a specific class of sequential systems are more successful. This becomes especially true if we will soon have to face the transition from VLSI to Ultra Large Scale Integration (ULSI) techniques with millions of equivalent gate functions on a single chip. Since computer-based simulation approaches that include the detailed timing of a low level system description fail because of the complexity and the high sequential depth of the target systems, the unsolved problem is the verification of the dynamic functional behavior of such systems.

BRIEF SUMMARY OF INVENTION

The central contribution of the present invention is that the dynamic functional behavior of hardware implementations of high-performance fast packet switching systems with data rates of 32 Mbit/s per line can now be evaluated in real-time. Since real-time approaches are orders of magnitudes faster than specific low level simulations, detailed behavior studies become feasible with reasonable turn-around times.

These system evaluations are performed with a novel apparatus which itself is based on a formal approach to testing the above class of systems. These systems have in common that they operate within certain speed ranges per external connection, and process packets of specific sizes and structure. The formal frame-work as well as the implementation consider the detection of transient system malfunctions. Malfunctions originate either from design faults or from physical system defects, and may occur with an extremely low probability in the order of $10^{-9}$ or even below. The transputer-based architecture of the novel implementation ensures an easy adaptability to switching systems of nearly any arbitrary size (in terms of input/output numbers).

The novel concept of detaching the environment model of the verification system (i.e., the transmitter portion which is responsible for the transmission of the test data,) completely from the result analyzer portion, is the basis for the proposed apparatus for verifying and characterizing geographically distributed telecommunication networks and switching nodes of the size of Metropolitan Area Networks (MANs) and even Wide Area Networks (WANs).

With the continuously increasing speed and complexity of networks and switching systems, formal real-time verification and characterization tools will become more and more indispensable. With some adaptations towards higher speed rates (Gbits/sec per line), formal evaluation approaches are attractive extensions for existing application oriented testbeds, such as the AURORA testbed.

ENVIRONMENT OF INVENTION

To more clearly define the area of applicability of the present invention, a brief account of telecommunication networks is necessary. In the past, the bottleneck in telecommunications networks has been the limited bandwidth of the transmission facilities. To optimize the use of the available bandwidths, two types of telecommunication networks have been developed which are strongly oriented towards the particular service they provide:

(1) "Circuit-switched" systems provide fully transparent connections with fixed bandwidth and constant delay for the entire duration of the connection. Telephone networks with their stream-oriented traffic of voice communication are the classic application of circuit switching, and Space Division Multiplexing and Time Division Multiplexing are the most frequently used techniques in circuit-switched networks.

(2) In contrast, "packet-switched" systems provide a virtual connection between two points of a network; connection is established physically only during the transmission time of packets. This feature allows a better utilization of transmission resources than circuit-switched connections do because the latter also remain established during their idle times. Characteristics of packet-switched connections are statistical multiplexing, highly flexible bandwidth allocation, and a variable delay during transmission.

Computer networks with their burst-oriented traffic characteristics are natural candidates for packet-switched systems. Conventional packet switches typically perform the switching functions by means of software processing on a general-purpose computer or a set of special-purpose processors. They provide a switching capacity of the order of one thousand packets per second with a nodal delay of 20–50 ms.

Two considerations characterize the present-day development in the network area: One is the desire to support the new applications emerging, such as digitized video and image communication, the other is the need for a single communications system which supports all services in an integrated and unified fashion. It has turned out that the most appropriate solution is a packet-switched system where the entire information to be transmitted is brought into the form of "packets". The term packet describes blocks of data not exceeding a predetermined maximum length. Accordingly, to transmit voice in a packet-switched system, the analog voice signals must first be partitioned into blocks of the appropriate length, and digital messages exceeding the maximum length must be broken up into several packets for individual transmission.

Advances in the development of semiconductor laser technology and glass fiber cables have led to a drastic increase in the bandwidth of transmission networks to the order of Gbit/s. Parallel to the progress in transmission technology, the trend in packet switching has gone from processor-based approaches to hardware-oriented switching systems capable of dealing with the bandwidth available today. Also, advances in very large-scale integration (VLSI) technology and improvements in the area of design methodology offer the opportunity to implement significant parts of an entire switching system on a single chip. Since the verification of a complex system starts in the design phase, it is an absolute requirement for the designer to use modern design tools to be able to manage the enormous complexity of VLSI designs.

Many high-performance fast packet switching techniques have been proposed and developed over the past few years. Examples representative of the large number of publications dealing with the subject are:

Lutz, K. A., "Considerations on ATM Switching Techniques", Journal of Digital and Analog Cabled Systems, Vol. 1, pp. 237-243, 1988.

Ahmadi, H., Denzel, W. E., Murphy, C. A., and Port, E., "A High-Performance Switch Fabric for Integrated Circuit and Packet Switching", in Proc. INFOCOM 88, New Orleans, La., March 1988, pp. 9-18.

Degan, J. J., et al., "Fast Packet Technology For Future Switches", AT&T Technical Journal, pp. 36-50, March/April 1989.

Ahmadi, H., Denzel, W. E., "A Survey of Modern High-Performance Switching Techniques.", IEEE J. of selected areas in communications, Vol. 7, No. 7, September 1989.

Tobagi, F. A., "Fast Packet Switch Architectures For Broadband Integrated Services Digital Networks", Proc. of the IEEE, Vol. 78, No. 1, January 1990.

The two Ahmadi et al. references cited above in particular describe the specific type of packet switching system to which the present invention applies.

In today's CMOS processes, the intrinsic gate delay no longer dictates circuit speed; interconnections and off-chip communication delays represent far more important limitations. This leads to the conclusion that placement and routing of a circuit have a substantial influence on the dynamic functional behavior. Since the impacts of placement and routing are not included in a HDL level representation, they cannot be verified with high-level simulation approaches. A complete verification of the design requires that all levels of abstraction in the behavioral direction be covered. After manufacturing, the system is tested for stuck-at defects at the gate and switch level. However, stuck-at testing detects only permanent system defects; dynamic faults are not covered.

OBJECTS OF INVENTION

It is accordingly an object of the present invention to provide a method and an apparatus for the testing and evaluation of geographically distributed packet switching networks as regards their dynamic functional behavior. It is emphasized that a particular object of the invention is to propose a method and apparatus that allow the term "geographically distributed" to encompass packet switching systems of the MAN (Metropolitan Area Network) and WAN (Wide Area Network) types.

BRIEF INTRODUCTION OF INVENTION

The present invention relates to a method for testing and evaluating the dynamic functional behavior of geographically distributed telecommunication networks, in particular fast packet switching networks comprising a plurality of transmitting stations, receiving stations and communication links connecting those stations for the transmission of traffic organized in the form of packets, wherein the packets contain a control block and a payload portion, the latter being devoted to carrying the user information. The inventive method involves the following steps:

Defining the primitive functional building blocks, such as paths, between the inputs and outputs of the network, Defining a set of target errors which the testing and evaluation is supposed to detect, Passing, during a testing and evaluation phase and/or during normal operation of the network, test packets around the network which contain, in addition to the information normally contained in their control block, in their payload portion all information relevant to their testing and evaluation task, instead of the user information normally contained in said payload portion, and Analyzing the test packets arriving at the output port of their path of transmission for any unexpected results.

The invention further relates to a verification apparatus for testing and evaluating the dynamic functional behavior of geographically distributed telecommunication networks, which is characterized in that it comprises a system environment portion, a result analyzer portion, a global controller and a test case generation portion, said system environment portion including a plurality of transmitters associated each with an input port of the packet switching network to be tested, said result analyzer portion including a plurality of receivers each respectively associated with one of the output ports of said packet switching network.

Details of the inventive method as well as of an embodiment of the inventive verification apparatus will hereafter be described by way of example with reference to a preferred embodiment thereof as depicted in the attached drawings in which:

FIG. 3 shows the general architecture of a shared memory switch;

FIG. 4 shows packet-switched traffic in a unified manner;

FIG. 18 illustrates a table showing the portion of a test packet in correspondence with the type of error it is designed to detect.

DETAILED DESCRIPTION OF PREFERRED EMBODIMENT

While the design of fast packet switching systems as such is not a subject of the present invention, it is appropriate to briefly reflect on the features and operation of these systems, and to touch on the initial—static—testing of their components in order to provide a clear definition of the terms used below to describe the invention.

The packets containing the information to be transmitted usually have a maximum length of 32 bytes. Their structure includes a control field for the destination address and for a typebit indicating the packet's priority level, and a payload field containing the user-relevant information. In the telecommunications field, a packet switching method known as Asynchronous Transfer Mode (ATM) is starting to become a CCITT standard. It specifies fixed-length packets comprising 48 bytes of data and 5 bytes of control information.

Common characteristics of fast packet switching systems (FPS systems) are a high degree of parallelism, distributed control, and routing performed at the hardware level. A fundamental feature of FPS systems is the necessity of storing packets in order to avoid losses if several packets are simultaneously destined for the same output. Three basic types of packet switching concepts can be distinguished:

The shared memory type,
the shared medium type, and
the space division type.

Figure 1:
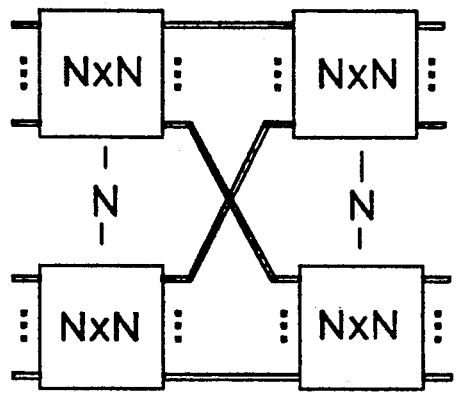
FIG. 1 shows a $N^2 \times N^2$ switch which is built of 2N ($N \times N$) switching modules.

Independent of the switching concept chosen, the technology used to implement the switch on an integrated circuit chip places certain limitations on the design of the switch in terms of input/output ports and speed. Therefore, large switching networks are built up of modules in single-stage or multi-stage configurations. FIG. 1 shows a $N^2 \times N^2$ switch which is built of 2N ($N \times N$) switching modules organized in two stages, where N denotes the number of input and output lines of the switching system. This switch offers a single internal path from every input to every output. There exist other multistage configurations which offer multiple paths from input to output ports.

Shared medium type switches typically employ a high-speed parallel bus or ring network as the switching medium. All packets arriving at the input lines are first converted from serial to parallel (S/P) and are then (usually) synchronously multiplexed onto the shared medium. The bandwidth of the shared medium (typically bus or ring) must be N times the bandwidth of a single input line.

Figure 2:
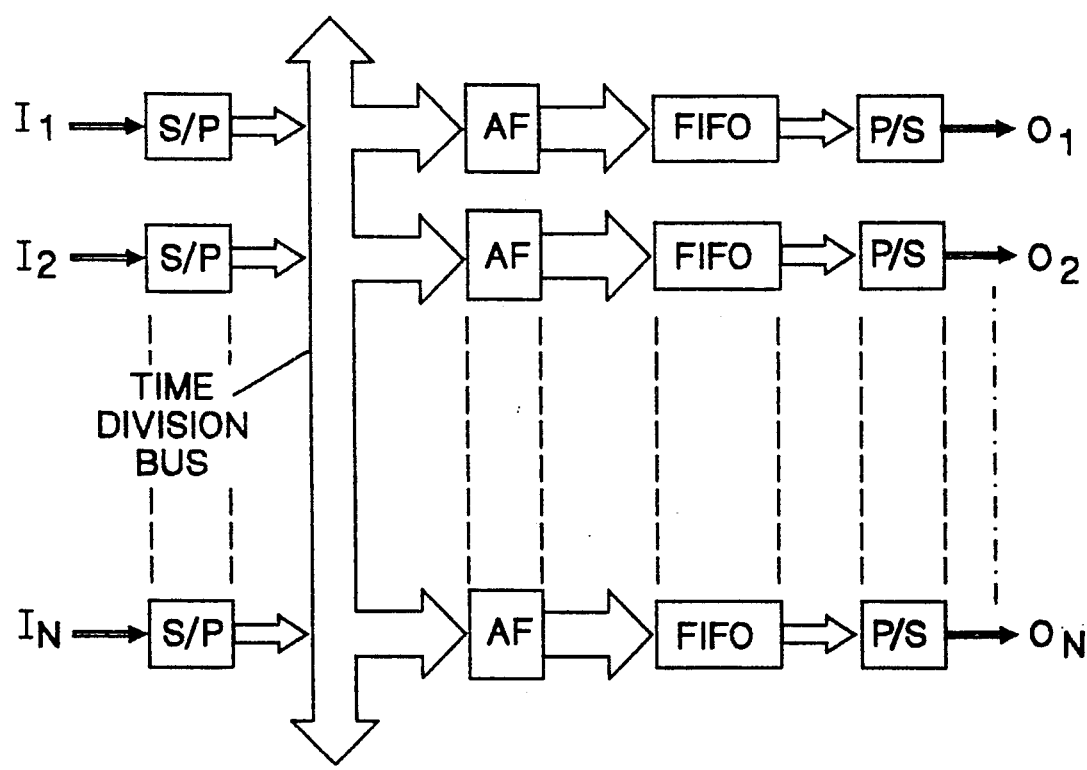
FIG. 2 shows the architecture of a shared bus type switching system.

FIG. 2 shows the architecture of a shared bus type switching system. Each output line $O_1 \ldots O_N$ is connected to the shared medium (time-division bus) via an interface that consists of an address filter (AF), an output FIFO (first in/first out) buffer, and a parallel to serial converter (P/S). Depending on the destination address of each packet, the address filter determines whether the packet observed on the bus is written into the FIFO buffer. Principally, the address filter operates as a demultiplexer. Since packets may be switched simultaneously from all inputs to one output, the address filter and FIFO buffers must also manage N times the bandwidth of a single line. If this condition can be fulfilled together with the bandwidth requirements of the bus, the shared medium type switch is non-blocking. The bandwidth capacities of the shared medium (i.e., the bus or ring) and of the memory (i.e., the FIFOs) are the major limitations of the size and extendibility (i.e., the number N) of realizable shared medium switches. The total amount of buffer memory is equally distributed among all output lines. A dynamic sharing of this memory to assist heavily loaded outputs temporarily is not possible. The buffer size is the critical parameter determining when under heavy-load conditions a buffer overflow will occur, which results in packet loss.

The kernel element of shared-memory type switches is a single dual-ported memory which is shared by all input and output lines. Packets arriving on the input lines are multiplexed (MUX) into a single stream which is fed to the common memory for storage. Internally to the memory, the packets are organized in separate (virtual) output queues, one for each output line. The control information that determines the packets' output destination is extracted from the packet header and transformed into an appropriate memory address. Simultaneously, packets are retrieved sequentially from the memory, demultiplexed (DMUX), and transmitted over the output lines. The general architecture of a shared memory switch is shown in FIG. 3.

A concern with respect to the shared-memory concept is whether the processing time required to transform the header information into a valid memory address and to issue the proper control signals to enqueue the packet, is sufficiently small to handle all incoming lines simultaneously. A central controller capable of processing N incoming packets and selecting N outgoing packets in each time slot, is required. Consequently, the memory is accessed N times per slot for enqueueing packets, and N times for dequeueing packets. If we assume V to be the speed per port, then the required bandwidth for the shared memory must be 2 NV. For example, in a $16 \times 16$ switch with a line speed of 32 Mbits/s, the memory bandwidth must be at least 1 Gbit/s. The corresponding access (i.e. read or write) cycle time for a memory with an 8-bit-wide data bus is less than 8 ns. Given the limitation on memory access speeds, the required memory bandwidth can be achieved by means of parallel memory organization. In a bit-slice organization, for example, each bit is written into a separate memory.

The finite size of the memory may prevent some packets from being accepted by the switch and cause them to become lost. Therefore, the memory size must be chosen such that the packet loss rate does not exceed a certain maximum. The size of the memory required is a function of the size of the switch (N), the offered load, the traffic pattern (bursty or equally balanced traffic), and -this is very important- of the way the memory is shared among the output queues. Principally, there are two possibilities:

Complete partitioning. In this case, the memory is divided into N separate partitions, each one allocated to a particular output queue. A packet is lost when an overflow condition at a single output queue occurs, independent of the contents of other queues.

Complete sharing. In this case, all output queues can share the entire memory. A packet is lost only if the entire memory is full.

Under the assumptions of equal memory size, traffic load, and traffic pattern, a switch that employs the complete sharing policy shows a significantly smaller packet loss rate than a switch with complete partitioning. Hence, complete sharing approaches lead to switching systems with minimum memory size requirements. Nevertheless, some problems may occur in connection with bursty traffic. It is possible, for example, that some heavily loaded output queues occupy the entire shared memory and thus block the traffic on other paths. A sharing policy with minimum and maximum allocation constraints could bypass this problem.

In contrast to the shared-medium and shared-memory concepts, where the traffic from all inputs is concentrated in a common resource operating with N times the bandwidth of a single line, space-division type switches establish multiple concurrent paths from inputs to outputs, each with the same data rate as for a single line. FIG. 4 shows a common model of a space-division switch. Depending on the internal structure of the switch, it may be impossible to set all required paths simultaneously. This characteristic, called internal blocking, is the main cause for throughput limitations.

Internally blocking switches cannot buffer packets at their outputs. Buffers must be located at the places where the potential conflict occurs, or upstream (e.g. at the inputs). For each input line, there is a router (i.e. demultiplexer) which routes the packets to N separate buffers, one for each output. For each output line, there is a concentrator (i.e. a multiplexer) which connects all buffers associated with the same output to the appropriate output line. Thus the space-division switch consists of N routers, N concentrators and $N^2$ buffers. The conventional space-division type switches differ in the way the router and concentrator are implemented and in the location of the buffers.

After this introduction to prior art FPSS approaches, the description now turns to the concepts and architecture of the novel testing method for high-performance switching systems in accordance with the present invention.

Figure 5:
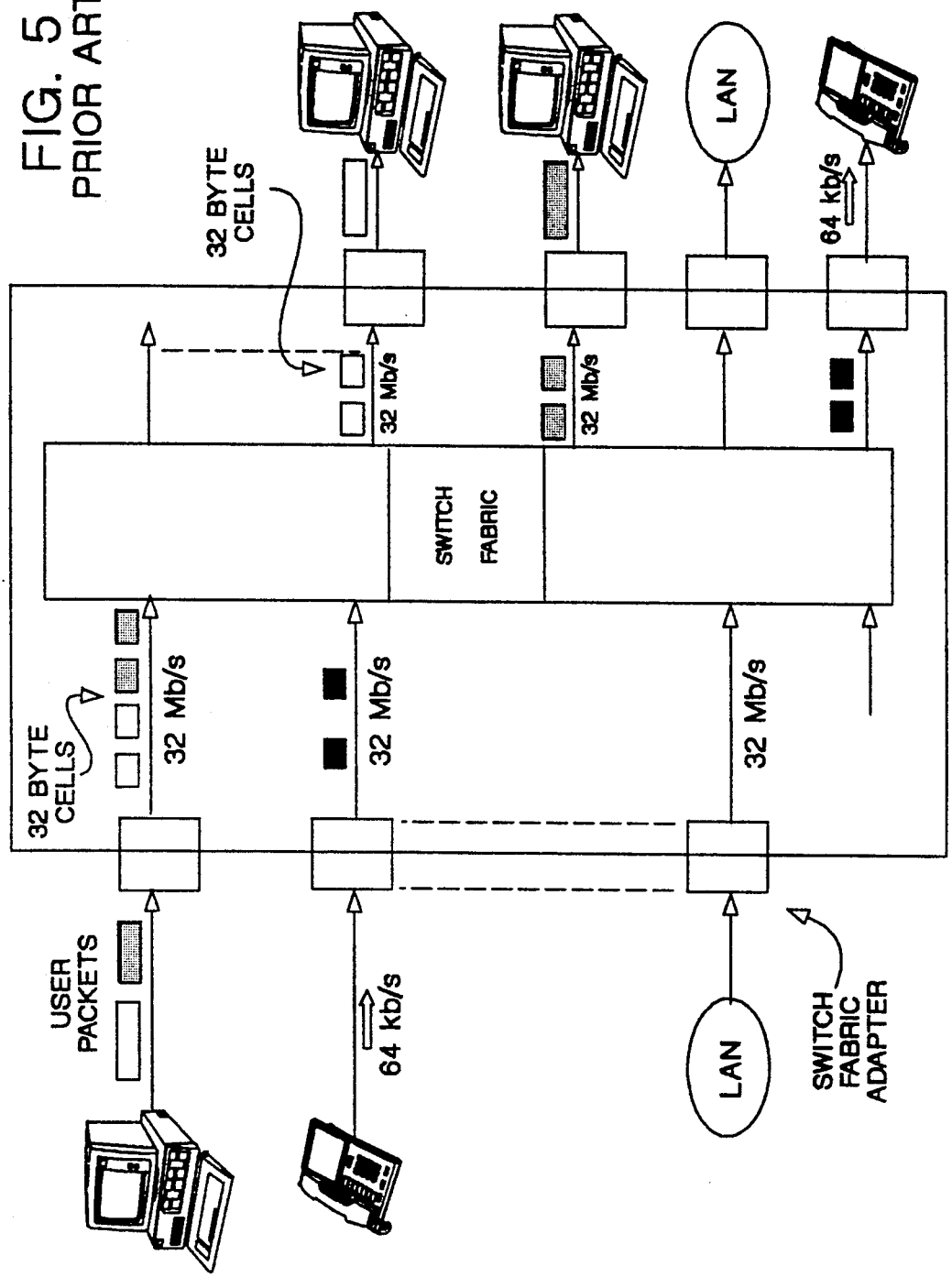
FIG. 5 is a visualization of a typical packet switching scenario.

Local telecommunication switching systems of the future must support a variety of interfaces, such as ISDN services, high-speed LAN interconnections, and high-performance work-stations. The idea is to have a switching system which is able to cope with circuit-switched as well as packet-switched traffic in a unified manner. A visualization of a scenario with the desired features described above is shown in FIG. 5. Circuit-switched traffic must be handled with priority, because there exist well-defined limitations on the length of time this kind of traffic, e.g. voice, may be delayed in a switching node.

The switching system consists of two major components:

the Switch Fabric Adapter (SFA) and
the Switch Fabric Elements (SFE).

The function of the SFA is to convert user information, which may be in the form of packet-switched or circuit-switched traffic, into uniform fixed-length minipackets at the input side of the switch, and to reassemble these minipackets to their original traffic type at the output side. Hence, external users are completely unaware of the internal minipacket mechanism. Minipackets of circuit-switched connections have priority over minipackets of packet-switched connections. The size of a minipacket is assumed to be 32 bytes including the header which contains the routing information. The term "minipackets" was chosen to prevent any confusion with cells as defined in the ATM proposal. However, the only difference is in the actual size of the packets (here 32 bytes, in ATM 53 bytes). For all basic considerations, a cell and a minipacket are identical.

Figure 6:
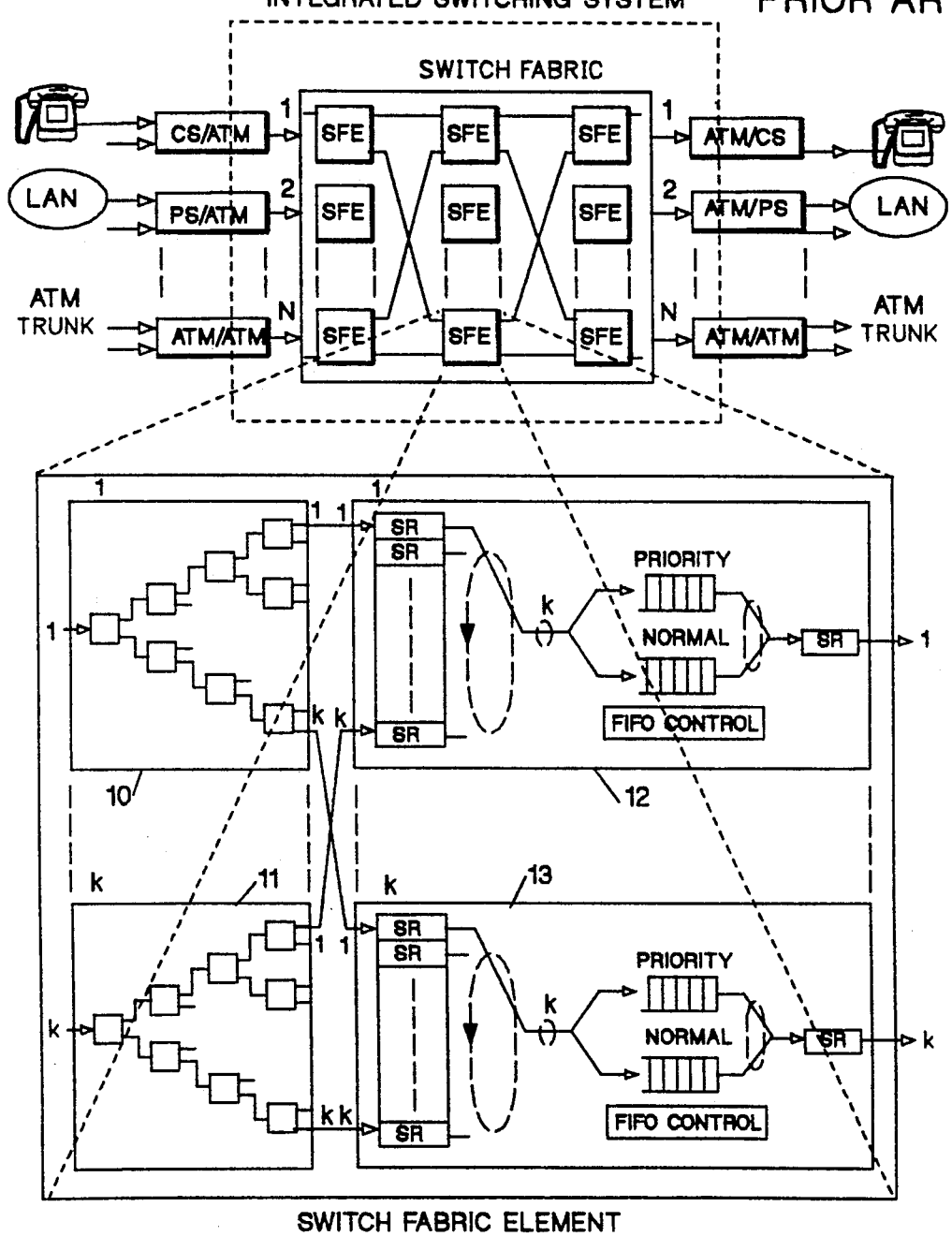
FIG. 6 illustrates the basic structure of a Switching Fabric Element.

The Switch Fabric Elements (SFE) are the basic building blocks which collectively make up the Switch Fabric (SF) network. The SFE is responsible for the switching of the minipackets. One SFE is integrated on a single chip and serves as a module to form fabrics of arbitrary size and complexity. The basic structure of an SFE is shown in FIG. 6. It consists of two major components: a self-routing segment 10, 11 and an output queueing segment 12, 13. A self-routing segment, which has the form of a binary tree, is used for each input to transport the minipackets to the correct output. One bit of the destination address at each level of the routing tree is sufficient to determine the way to the next level. For a 16×16 switch, four levels are necessary for the routing tree.

The minipackets can be routed in a simultaneous fashion between all input-output combinations without causing any conflicts. Since this is equivalent to freedom from internal blocking, output queueing is sufficient for these switches. Conceptually, this is a space-division type switching system with $N^2$ disjoint paths among inputs and outputs. The interface between the self-routing segment and an output line consists of shift registers SR, which can hold a single packet for intermediate storage, and a pair of FIFO queues, which constitute the output queueing segment.

Since two different priorities must be handled, namely for voice and data, it is necessary to provide two independent output queues. The importance of the shift registers is to ensure that no packets are lost during the time a round-robin controller transfers the minipackets sequentially to the associated output FIFO. This task corresponds to the concentrator function of the general space-division model in FIG. 4. The controller and the FIFO elements must provide a bandwidth of N times the bandwidth of a single line. The speed on each port is assumed to be 32 Mbit/s. One SFE is a chip with a complexity of $10^6$ transistor functions (or approximately $10^5$ equivalent 2-input gate functions), including a 64 kbit memory. This huge amount of memory is responsible the high sequential depth of these devices.

Given the complexity of the switch fabric elements, of the switching fabric and of the entire switching network, it is mandatory to make sure that the whole system and its parts live up to expectations. The process employed to generate that certainty is called "Verification". It is a test as to whether a system performs the intended functional behavior correctly. A design or system is correct if it is possible to prove that its implementation realizes the specifications. A complete design verification includes all different levels of abstraction and all possible directions. Different approaches are known to verify a system design:

Formal verification tries to prove the correctness of a design by formal reasoning based on the existing design documents.

Verification based on simulation means to construct a system, called model, which behaves like the intended system, i.e., verification based on simulation means to analyze whether the modelled system has produced correct results from the offered input.

A complete verification system based on simulation consists of the following main components:
an executable model of the system under design,
an executable model of the system environment,
a result analyzer, and
a global control unit for the system environment and the result analyzer.

The credibility of a verification based on simulation depends on all components and models involved. All results obtained through simulation refer to the model of the system under design. If the system model mirrors the design specifications insufficiently, the results of the verification are only loosely coupled with the intended system. A precise and correct model of the system environment is, therefore, absolutely necessary. Finally, the produced results are only as good as the analysis applied to them. Large amounts of results require a semiautomatic or even automatic result analysis mechanism.

The increasing complexity of VSLI designs requires a specification-language like design entry to avoid errors and to increase designer productivity and satisfaction. A design entry with a hardware design language (HDL) at the register transfer level, or at a higher level, fulfills this requirement. Extensive functional simulation of the HDL description supports the detection of logical design faults within acceptable computational complexity. Furthermore, advanced automatic logic synthesis tools which transfer the HDL-level specification of a design down to a technology-dependent representation at the switch level are required.

In order to determine the testing strategy for the packet switching system, the question to be considered is: "What can happen to a packet that is sent over a path through the system?" The following is a list of the system errors which may occur, and which have a major impact on the functional behavior of the switching system.

A packet is lost,
a packet is duplicated,
packets arrive in the wrong sequence,
a packet arrives at the wrong output,
a packet arrives with the wrong packet length,
the contents of a packet have been corrupted, or
the packet delay is unacceptable.

Each error describes a system fault as the result of a malfunction on a path. And each error in the list stands as a representative, or model, of a class of faults at a lower level of abstraction. All system defects—independent of whether they originate from a physical defect or a design error,—that map at the system level of abstraction on one or more of the listed errors are detectable with the test method in accordance with the present invention.

Two main sources of problems with testing tools are the complexity of the systems to be tested and the lack of controllability and observability of system constituents: All internal states of a system are accessible only via the external inputs, and observable via the external outputs. In general, the task of test generation for an assumed fault is divided into the two main activities of Fault Setup and Fault Propagation.

Fault Setup means that specific input stimuli are required to produce a difference in the logical output of the functional primitive, where the fault is assumed to be located, between the two cases when the fault is present and when it is absent. Fault Propagation means that specific input stimuli are required that propagate the result of the fault setup to an external system output. The input stimuli for the fault propagation should not be in conflict with those for the fault setup. The objective of the setup and propagation step is the ability to decide—depending on an external output result—whether or not the assumed fault is present. Generally, fault setup and fault propagation are difficult and computation time-consuming tasks.

A reasonable unit for such input stimuli of packet switching systems at the system level are entire packets. One can profit from the fact that the output address of a packet exclusively controls the whole path of the packet through the system. Consider now the following experiment: A packet is sent over a path that is assumed to contain a fault. If there really is a fault on the path that somehow influences the packet (e.g., destroys the packet or corrupts its contents), a logical difference compared to a fault-free system is produced. If the fault does not cause a packet loss, the output address ensures that the packet is forwarded to the primary output of the assumed fault path. Thus, insertion of the correct output port address in the packets solves the fault setup and fault propagation problems.

Paths are defined as functional primitives that directly connect primary inputs with primary outputs. The simple fault setup and propagation is a result of choosing a high level of abstraction for the system description, but the functionality of high-performance FPS systems depends to a great extent on the traffic load on the assumed fault path.

Considering a multistage switching system where the assumed fault path shares the output queue of the first stage with one or more other paths, it is obvious that the traffic load on the secondary paths has an impact on the delay, or the functionality, of the packets from the assumed fault path. In order to test a path of the switching system, it is also necessary to consider the traffic conditions on those paths that share functional components with the assumed fault path. Therefore, the ability to add "cross traffic" is required. One conclusion of this fact is that a verification system must be able to provide various input ports of PSSs with test data.

The next question is how to distinguish, at a primary output of the switching system, between packets that have been switched correctly and those which have not. Somehow the result analyzer of the verification system must know what a correct packet looks like and in which sequence the packets should arrive.

A common approach is to send the same test data, inserted at the primary inputs to the system under test, around the system to the side of the primary outputs and then compare the actually processed data with the expected data derived from the external transmission. In our case, the target system is a hardware prototype implementation of a high-performance FPS system which means that the verification is performed under real-time conditions. A requirement for the external system is a high-speed link which transmits the test data from all input ports to the output side of the target system. The bandwidth of this high-speed link must be m×32 Mbit/s where m is the number of inputs of the switching system and 32 Mbit/s is the bandwidth of a single input port. Even a system with few inputs (m=16) would exceed the technological possibilities to implement such a link. Another nontrivial problem is the control mechanism to attach the single input ports to the high-speed link and to compare the results from the switching system with the externally transmitted data.

During testing, no user information is transmitted in the payload part of the packets. This means that this empty space can be used for test purposes. In accordance with the invention, it is suggested that the payload portion of a packet be used to transmit pertinent test information during testing.

Figure 7:
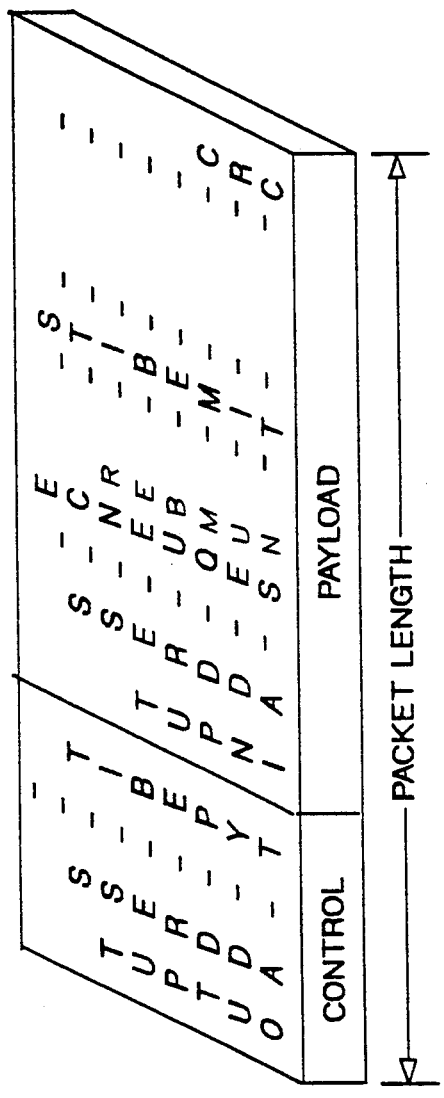
FIG. 7 shows Control Block and a Payload Portion of the packet structure.

In general, a packet comprises a Control Block and a Payload Portion as shown in FIG. 7. The Control Block of a packet contains the destination address (OUTPUT Address) and a TYPEbit that indicates the priority of the packet. The Payload Portion is used to transmit the user-relevant information. For test purposes, additional information is inserted in the payload portion at the input side of the switching system, and the contents of the arriving packets are evaluated at the output side.

Specifically, in the payload portion an INPUT Address (indicating the source of the packet), a SEQUENCE Number, TIMEbits, and a CRC code (Cyclic Redundancy Check code) that covers the entire packet including the control block, are inserted. The remaining bits in the packet are randomly filled with logic zeros and ones. Thus, each packet contains sufficient information to detect every error listed above. A comparison of the various portions of a packet with the errors they are to detect is shown in the table illustrated as FIG. 18.

Error detection is performed by analyzing the arriving packets at the output of the assumed fault path for unexpected contents. In order to be able to distinguish between correct and incorrect packet contents, it is necessary to store information on previously received packets.

For example: An important check is whether all packets originating from the same source (i.e. the same input port) arrive in the same sequence as they were sent out. Since packets may be sent from every input to every output of the PSS, it is necessary that the expected sequence numbers of packets from all possible inputs are stored separately at the output of the assumed fault path. Whenever a packet arrives, the actual sequence number in the packet is compared with the expected number corresponding to the input address of the packet. A detailed description of the operation of the error checker will be given below.

As already mentioned, it is not necessary to restrict the number and location of simultaneously existing faults in the switching system. All faults on those paths that either have the observed output $o_k$ as destination address, or that cause a misrouting of packets from any other path to the output $o_k$, are detectable during the observation of a single output $o_k$. Faults that misroute packets with the destination address $o_k$ to another output are detected as "packet loss" errors. Faults that misroute packets from an arbitrary path to the output $o_k$ are detected as "packet at the wrong output" errors.

The traffic load at output $o_k$ is determined by the sum of all packets routed to this destination from any input port. It must be ensured that the total traffic load does not exceed the maximum capacity of the output port.

While it has been shown above that single test packet containing special information solves the fault setup and fault propagation problems for packet switching systems at the system level of abstraction, it is clear that such a single test packet does not already represent a valid test that would allow a decision as to whether the switching system has performed its task correctly. Sequences of test packets simultaneously sent from several inputs to several outputs and under various loads are required in order to evaluate the behavior of the switching system.

The insertion of the test information into the payload portion of a test packet (that does not have to carry user information) allows the testing and evaluation of widely distributed packet switching systems because no other link to the destination of the packets is required than is contained in such test information.

Automatic test generation for entire circuit boards is more complex than for ICs, and it is impractical for boards of greater complexity. ISO and CCITT recommended in their activities for OSI conformance testing that a distinction be made between abstract and executable test cases. The user has to specify abstract test cases in the form of a particular test method. An executable test case is derived from an abstract test case, and is in a form that allows it to be run on a real tester for testing a real implementation of the system under test.

Therefore, a formal notation is here provided which allows abstract test cases to be specified for a particular type of packet switching system, and a tool which compiles the abstract test cases automatically into executable test cases suitable for a specific verification system. This "semi-automatic" approach requires a certain amount of user interaction to denote the abstract test cases. The formal notation for the abstract test cases is given below. The implementation of the tool to generate the executable test cases is presented afterwards.

In order to specify test cases in a formal and abstract manner, use will be made of well-known constructions of high-level description (or programming) languages which are combined with new key words. Consideration is to be given to what information is required to describe an abstract representation of a test case. First of all, the properties of the switching system under test must be specified. The size and configuration of the switching system determine the location of the destination addresses in the packets. Also, the number of inputs and outputs of the system is specified, and whether it is a single- or multi-stage switch. An example of such a specification of a switch configuration might look like this:

⌐configdef Example—Switch;
⌐⌐totalinports⌐=⌐16;
⌐⌐totaloutports⌐=⌐16;
⌐⌐totalstages⌐=⌐1;
⌐econfigdef The functional primitives that are assumed to be faulty in a system-level representation of a packet switching system are paths along which the packets are to travel from a specific input port to the addressed output port. Therefore, all paths involved in the particular test run must be identified, as well as the kind of traffic that is transmitted over those paths. We define the set of packets of a specific type of traffic (high- or low-priority), and that all have the same source and destination address as a message. An example of the specification of a message for a specific path and priority might look as follows:

```
¬ message hp_example;
 ¬¬ switch¬ = "Example_Switch";
 ¬¬ priority¬ = high;
 ¬¬ path¬ = (inport 1 to outport 9);
 ¬¬ packets¬ = 8;
¬ emessage
```

For each path involved in a test run, a separate message has to be specified. Finally, the traffic loads with which the specific paths are to be stressed must be determined. A specific load is established by performing a scheduling of the test packets. An example of such a schedule file is shown below:

```
scheduledef Test;
 usemessage¬ mes0¬ = ¬ "\hypertest\hp_example",
 ¬ mes1¬ = "¬hypertest\lp_example";
 transmitter 0;¬ highpriority (mode=retransmit,
  totalslots=4*64); ¬ ¬ slot<i=0 ¬step ¬64¬for
  4>¬¬¬/* We
   want 4 frames a 64 slots¬*/
  ¬¬¬slot<j=i for 16>¬¬/* Insert in 16 slots of
    each
    frame...¬ */
   ¬¬¬¬ j: mes0;¬ /* a packet of message mes0.¬*/
   ¬¬¬ eslot;
  ¬¬ eslot;
 ¬ehighpriority;
 ¬lowpriority (totalslots=32);
  ¬¬slot<i=0 for 32>
   ¬¬¬ i: mes1;¬¬/* Send all packets in a burst.¬ */
   ¬¬ eslot; ¬elowpriority; etransmitter;
 escheduledef
```

Figure 8:
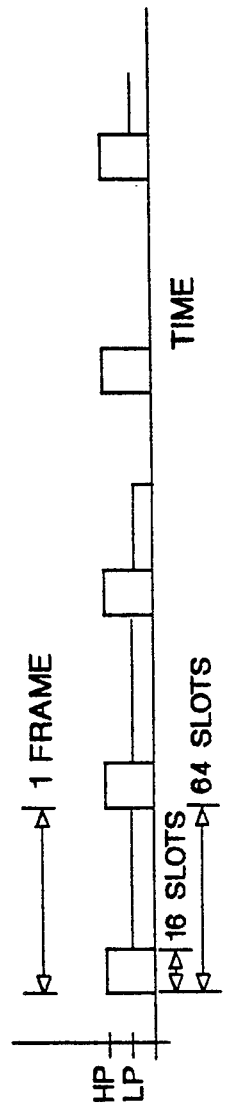
FIG. 8 is a schematic sketch of a schedule file representing packet-switched traffic.

The statement "mode=retransmit, totalslots=4*64" indicates that it is intended to send a continuous stream of traffic in repetitive cycles of 256 slots (one slot has the size of a single high-priority packet). The basic scheduling of the packets is performed in two nested loops. The first loop partitions the 256 slots into four frames of 64 slots. The inner loop forces the first 16 slots of the frame to be filled with packets of the message mes0. Slots that contain no packets of any message are handled as pauses. This schedule file represents traffic as shown in FIG. 8.

High-priority packets (voice traffic) are transmitted in periodic frames while low-priority packets (computer data) are transmitted in bursts. Combining several such or similar kinds of traffic, each sent from a different transmitter to the same destination, into one schedule file, offers the possibility of defining complex test cases in a clean, formal, and readable manner.

In order to verify the dynamic functional behavior of a PSS, a number of packets is sent through the system and a check is made at the output side whether the packets have the expected contents. However, it is not practicable to cover the input space exhaustively, because this would actually mean having to assign all possible variations of packet patterns under all possible load conditions to all inputs of the switching system.

One way to express the reliability of switching systems is to measure the error probability for outstanding system malfunctions (e.g., the error probability for a packet loss in system X is $10^{31\,z}$). The problem here is to characterize a system if no errors are detected within the testing period, or if the number of detected errors is too small to allow reliable statistical statements. In these cases, an information-theoretical approach to the verification can provide a solution.

In statistical testing, the presence of a fault corresponds to a non-zero probability of error in the output. In the following, the adaptation of the information-theoretical analysis to packet switching systems is performed and it is determined how long the test method described must be applied to achieve a certain amount of confidence in the correctness of the design.

When a packet switching system is supplied with an information rate of $H_i$ bits per packet at the input, the information rate at the output is $H_o$ bits per packet, and if the PSS contains no information source, then $H_o$ cannot exceed $H_i$ ($H_o \leq H_i$). The actually delivered output rate $H'_o$ is even smaller than $H_o$, because some of the output packets are assumed to be incorrect due to system defects ($H'_o < H_o \leq H_i$).

For a packet of N bit length, there exist $2^N$ possible packet patterns. The statistical information per packet is defined by Shannon via the occurrence probabilities $p_i$ of each packet pattern i to $$H = \sum_{i=1}^{2^N} p_i \log_2 \frac{1}{p_i}. \quad [1]$$

For a given input source, a fault-free system can produce $2^{H_o T}$ correct packet sequences of the length T, each with almost equal probability, in accordance with McMillan's theorem, and its accuracy improves as the length T of the sequences increases. Assuming that a system defect reduces the information of each packet by a fraction $\alpha$ to $H'_o = (1-\alpha)H_o$, then the corresponding number for the faulty system is $2^{(1-\alpha)H_o T}$ sequences of the length T. The probability for a faulty system (i.e., $0 < \alpha \leq 1$) to deliver a sequence of correct packets, which is equivalent to the probability that the system fault has not been detected, is $$P(\text{test passed} | \alpha) = \frac{2^{(1-\alpha)H_o T}}{2^{H_o T}} \quad [2]$$

$$= \frac{2^{H_o T} 2^{-\alpha H_o T}}{2^{H_o 1}} = 2^{-\alpha H_o T}.$$

This probability goes to zero as T is increased, i.e. the longer the test sequence, the more likely it is to detect the fault! Also, the probability decreases at a faster rate, the higher the rate of $H_o$. This fact allows the following conclusion to be drawn: In order to detect a defect in a system, it is recommended that the information rate $H_o$ at the output of the system be maximized.

The probability of the system passing the test is obtained by integration over all possible values of $\alpha$:

$$P(\text{test passed}) = \int_0^1 2^{-\alpha H_o T} d\alpha = \frac{1 - 2^{-H_o T}}{H_o T \ln 2}. \quad [3]$$

Equation [2] presents an expression for the probability of a system passing the test under the condition of a present fault. Using Bayes' rule $$P(A|B)P(B) = P(B|A)P(A)$$

and equations [2,3] one gets an expression for the probability density that the information reduction is α under the condition that the system has passed the test:

$$p(\alpha | \text{test passed}) = \frac{P(\text{test passed} | \alpha) p(\alpha)}{P(\text{test passed})} \quad [4]$$

In the absence of any a priori knowledge of the probability density p(α), it might be reasonable to assume that α is uniformly distributed (i.e., p(α)=1) in the interval [0;1]. Together with the substitution of the results of equations [2, 3] one obtains:

$$p(\alpha | \text{test passed}) = \frac{2^{-\alpha H_o T} H_o T \ln 2}{1 - 2^{-H_o T}}. \quad [5]$$

The probability that the information reduction α due to system defects will not exceed an upper bound of $\alpha_{max}$ under the condition that a packet sequence of the length T detected no error, is calculated via the integral over the density function in equation [5]:

$$\begin{aligned} Q(\alpha_{max}) &= P(\alpha \leq \alpha_{max} | \text{test passed}) \\ &= \int_0^{\alpha_{max}} p(\alpha | \text{test passed}) d\alpha \\ &= \frac{H_o T \ln 2}{1 - 2^{-H_o T}} \int_0^{\alpha_{max}} 2^{-\alpha H_o T} d\alpha \\ &= \frac{1 - 2^{-\alpha_{max} H_o T}}{1 - 2^{-H_o T}}; \end{aligned} \quad [6]$$

Equation [6] is now resolved such that $\alpha_{max}$ is a function of $H_o T$ with Q as a parameter:

$$(1 - 2^{-H_o T})Q = 1 - 2^{-\alpha_{max} H_o T} = 1 - (2^{-H_o T})^{\alpha_{max}}; \quad [7]$$

$$\alpha_{max} = \frac{\ln(1 - (1 - 2^{-H_o T})Q)}{\ln(2^{-H_o T})}; \quad [8]$$

For $H_o T > 1$, the $2^{-H_o T}$-term in the dividend can be neglected. The extraction of $H_o T$ from the divisor finally leads to:

$$\alpha_{max} = \frac{\ln(1 - Q)}{-\ln 2} \cdot \frac{1}{H_o T}. \quad [9]$$

Figure 9:
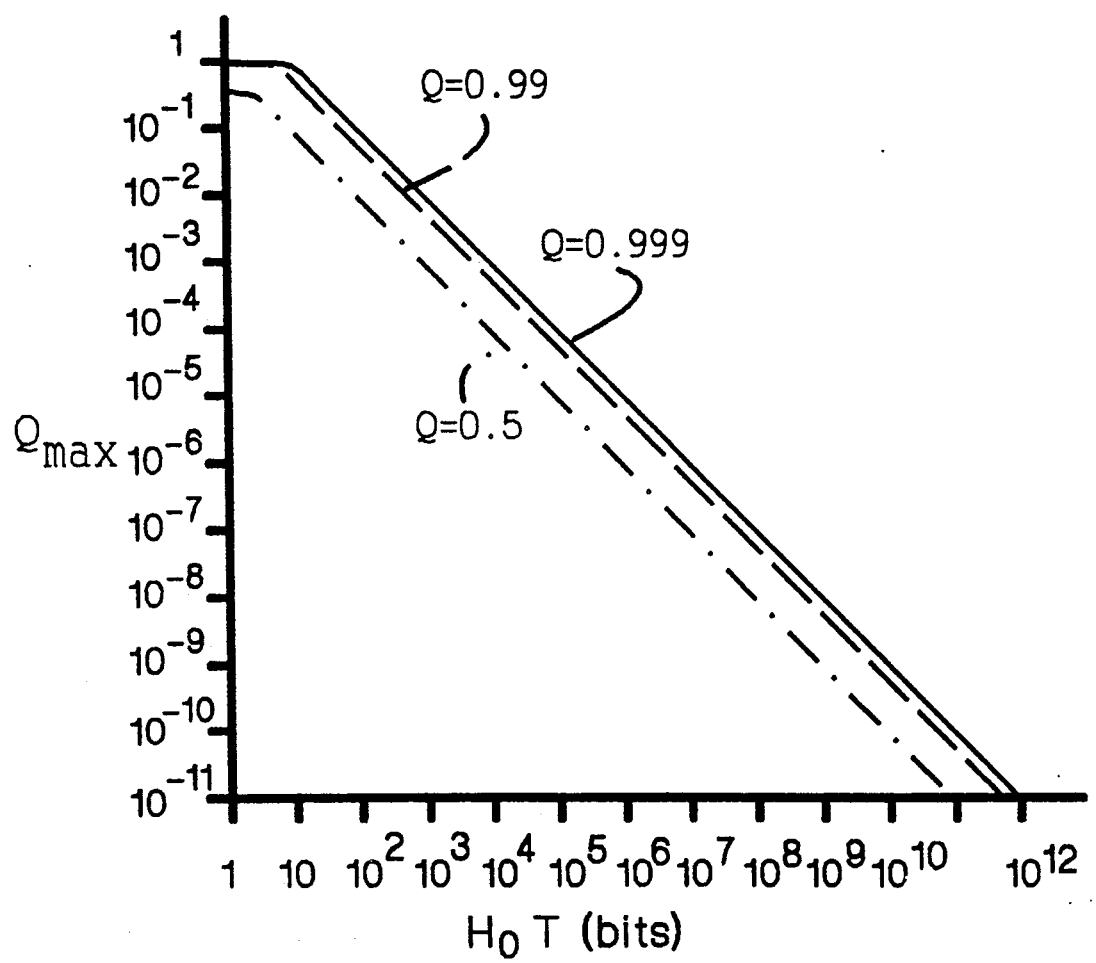
FIG. 9 shows the relationship between $a_{max}$ and the test length & Ho.T for three probabilities Q.

FIG. 9 shows the relationship between $\alpha_{max}$ and the test length $H_o T$ for three probabilities Q. The term Q is the degree of confidence that an undetected system fault will produce incorrect output results with a rate of less than $\alpha_{max} H_o$ bits per packet or per time unit. Since each packet contains $H_o$ bits of information, we can also interpret $\alpha_{max}$ as the probability of receiving an incorrect packet, or as the probability of the system to fail.

Equation [1] indicates that a packet stream delivers a maximum amount of information per packet if each packet pattern occurs with the same probability. This means that the probability for each bit to be one or zero is equal to one half. As mentioned above, the sequence number, input address, timebits, and CRC code in a packet are required to detect malfunctions in the switching system. To examine the impact of these entries on the content of the information, a packet is regarded as a bit stream. Observing only one output, the first bits of each packet contain the output port address which is always identical. Thus, the bits that represent the output port address contain no information in the sense of Shannon's definition. (An exception is the case that a packet arrives at the wrong output. Since this event is assumed to have a small probability of occurring, its mean content of information is neglected.) The type bit, the sequence number, the input address, the time bits, the remaining empty space in a packet, and the CRC code are—regarded over the long term—equally distributed and therefore contribute significantly to the information content per packet. (The long-term view is required to meet Shannon's definition of statistical information.)

When n is the bit length of the output port address, and N the bit length of the entire packet, then the maximum information at one output is N−n bits per packet. If the special pragmatic entries (i.e., sequence number, etc.) do represent equally distributed bit patterns in the long-range view, this results in packets with the maximum possible amount of information per packet.

Since high-priority and low-priority packets have different lengths, they contain different amounts of information. When both types of packets appear in a long test sequence with equal probability, the mean content of information per packet is calculated to be:

$$H_o = \frac{56 + 248}{2} = 152 \text{ bits per packet,} \quad [10]$$

where 56 (=64−8) bits per packet is the maximum achievable information of a high-priority packet, and 248 (=256−8) bits per packet is the maximum achievable information of a low-priority packet. (For both types of traffic the output address is 8 bits long.)

Another statistical test setup is to send packets randomly from various inputs such that in the statistical mean a defined traffic load and ratio between high and low-priority traffic constitutes at the outputs. In this case the mean content of information per packet is calculated to be:

$$H_o = \frac{h \times 56 \times \left(\frac{l}{4}\right) \times 248}{h + \left(\frac{l}{4}\right)} \text{ bits per packet,} \quad [11]$$

where h [%] and l [%] are the contributions of the high and low-priority traffic to the total traffic, respectively. The total traffic load on an output port is h+l, which may never exceed 100%. The traffic load indicates the ratio between packet traffic and pauses. It is to be noted that, in order to generate the same high and low-priority loads, the number of low-priority packets is one-fourth that of high-priority packets. When the information rate is normalized to a constant time unit equal to the duration of a high-priority packet (i.e. 2 μs), one obtains:

$$H_o = \frac{h \times 56 \times \left(\frac{l}{4}\right) \times 248}{100} \quad [12]$$

$$= \frac{h \times 56 \times l \times 62}{100} \text{ bits per time unit.}$$

When t [s] is the duration of the test sequence, T becomes $$T = \frac{t}{2 \times 10^{-6}} = \frac{t}{2} 10^6. \quad [13]$$

To give an example for how long an output of a switching system must be analyzed to ensure with 99.9% confidence that the probability of a system defect to occur on a path to a given output is less than $10^{-10}$, where the mean total traffic load is assumed to be 90%, with a contribution of 60% high-priority traffic and 30% low-priority traffic:
The information per time unit is calculated to be:

$$H_o = \frac{60 \times 56 + 30 \times 62}{100} = 52.2 \text{ bits per time unit.} \quad [14]$$

With $\alpha_{max} = 10^{-10}$ and $Q = 0.999$, FIG. 8 provides the required information of $H_o T \approx 10^{11}$ bits. With equation [13] one finally obtains:

$$t = \frac{2 \times 10^{11}}{H_o \times 10^6} = \frac{2}{H_o} 10^5 = 3831 \, s \approx 1 \text{ hour.} \quad [15]$$

After the presentation of a formal way to verify the dynamic functional behavior of novel types of high-performance packet switching systems in real time, with the inclusion of time-variant system defects, which may occur randomly, the following describes the architectural considerations and functional aspects of an implementation of a testing-based verification system in accordance with the present invention. An important design goal for the verification system is the applicability to various switching systems which differ in the number of input and output ports. No doubt, most flexible and generally applicable is a multi-processor implementation which offers for each input port and for each output port of the switching system a separate microprocessor.

Figure 10:
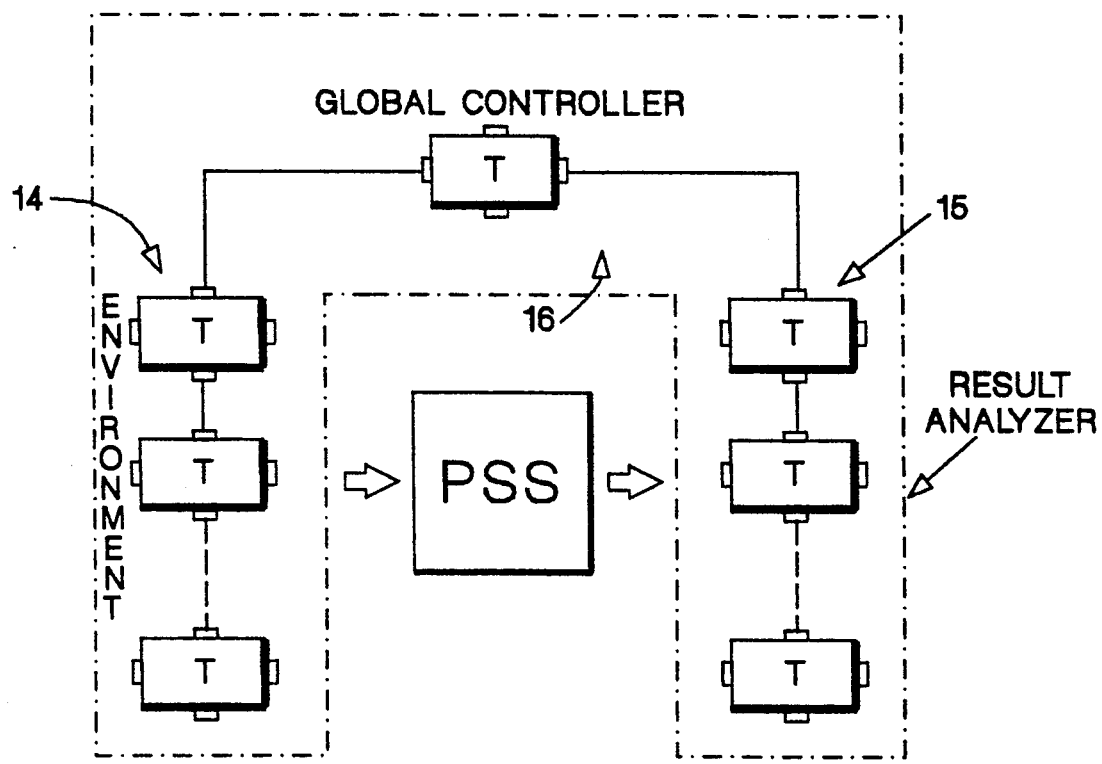
FIG. 10 shows the overall structure of the verification system.

FIG. 10 shows the overall structure of the verification system of the invention which comprises an environment portion 14, a result analyzer portion 15, and a global controller portion 16. All of these portions are made up of so-called transputers, commercially available, versatile and powerful processing units which can be easily connected to form networks. A detailed description of the transputer architecture and its features can be found in "Transputer Reference Manual" INMOS Limited, Prentice Hall, 1988.

Figure 11:
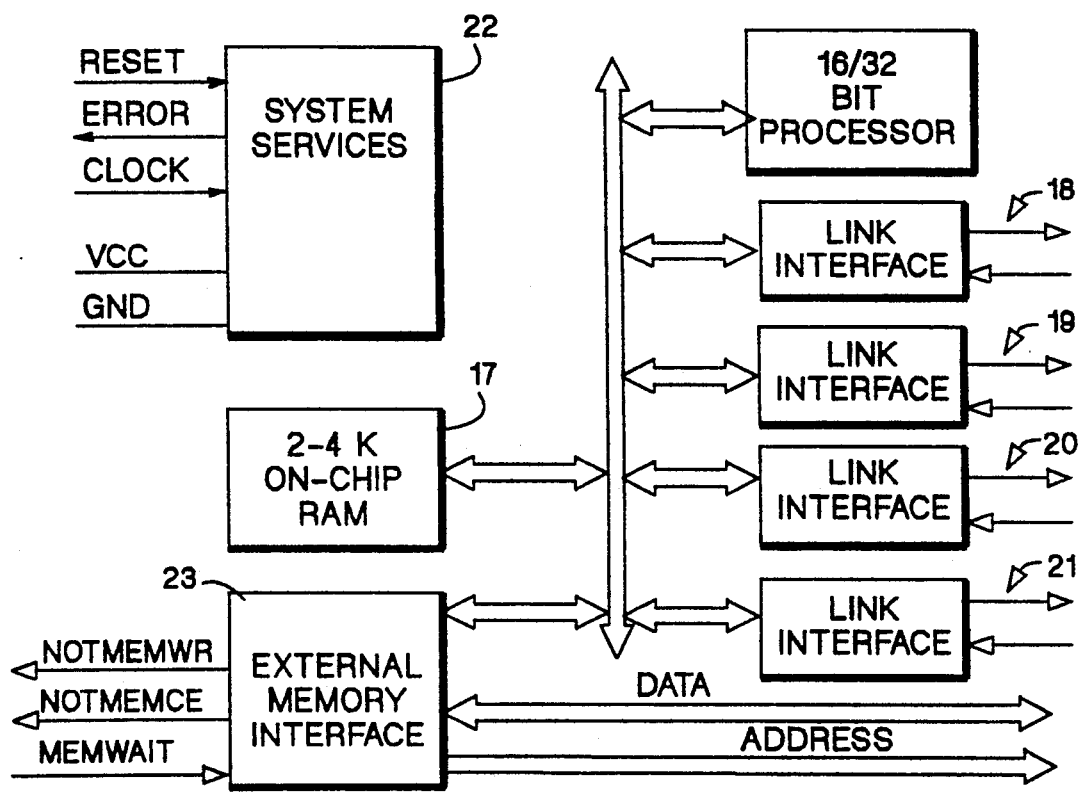
FIG. 11 illustrates the organization of a transputer.

Briefly, a transputer (FIG. 11) is a one-chip microcomputer with its own local memory 17 and with communication links 18 . . . 21 for direct connection to other transputers. In addition, each transputer contains special service circuitry 22 and an external memory interface 23 which allows to access additional memory or to control peripheral hardware. All components of a transputer are integrated on a single VLSI chip. A significant feature of transputers is that point-to-point communication links allow the construction of transputer networks of arbitrary size and topology. This feature avoids the specific problems that occur when all involved processors are connected by a single bus (e.g. limited bandwidth of the bus; electrical problems related to driving capabilities of buffers; necessity to have additional control logic for the access to the shared bus). The fact that each transputer in a network has its own local memory ensures that the overall memory bandwidth is proportional to the number of transputers in the network. This on-chip random access memory 17 for high-speed processing ranges from 2 Kbytes in the case of a commercially available IMS-T212, up to 4 Kbytes, in the case of an IMS-T800. The IMS-T800 transputer has a 32 bit CPU with an additional floating point unit and special instructions for graphics support. The processor speed of this device is pin-selectable in stages from 17.5 MHz up to maximum 30 MHz.

The serial communication links 18 . . . 21 are high speed device interconnections which provide full duplex communication between members of the transputer family. The standard link communication frequency is 10 Mbit/s. To provide synchronized communication, each message must be acknowledged. Consequently, each link consists of two unidirectional signal wires carrying both data and control bits. A separate transputer is used for each input and output port of the switching system. Therefore, the hardware complexity for this approach grows linearly with the number of ports.

Transputers are programmable in several high level programming languages. One preferred example of a programming language is OCCAM which allows parts of the software to be run in parallel. OCCAM can be used to program a single transputer or a network of transputers. When OCCAM is used to program an individual transputer, the transputer shares its time between all processes, and channel communication is implemented by moving data within the memory. When OCCAM is used to program a transputer network, each transputer executes the processes allocated to it. Communication between OCCAM processes on different transputers is implemented directly by the serial transputer links.

The packet switching system processes serial data streams at its external ports. While a connection between the switching system and the transputers of the verification system via the serial communication links 18 . . . 21 seems to suggest itself, this is not possible because of the insufficient transmission rate of 10 Mbit/s on the links. A 20 MHz transputer clock corresponds to a processor cycle time of 50 ns. A write operation to the external memory interface takes two transputer cycles, or 100 ns. An 8 bit wide data bus offers a bandwidth of 8 bit/100 ns = 80 Mbit/s which is sufficient to satisfy the demands of a single input or output port of the switching system. Connecting the system under test with the transputers via the external memory interface 23 requires at least some hardware additions for parallel to serial conversion, for clock separation between transputer and switching system, and for signal level (i.e. TTL to ECL) adaptation on the environment and result analyzer portions 14, 15 of the verification system.

For switching systems operating with a 32 MHz clock, the transputer has 40 transputer cycles (or 2 μs) to process an 8 byte long high-priority packet. Reading the packet to the transputer already takes (8×2 cycles=) 16 cycles. (An external read operation takes two transputer cycles.)

Because of the impossibility to write an assembler program with the transputer instruction set that performs all desired error checkings in the remaining 24 transputer cycles, system-specific hardware additions at the result analyzer to extract pertinent information from the incoming data stream and to apply the necessary checks which allow to decide in real-time whether an error has been detected or not, are necessary. Only unexpected events, i.e. observed errors, and status information about the internal state of the result analyzer are reported to the controlling transputer. Based on this information, the transputer either performs statistical computations (e.g. counting of the faulty events) or initiates control commands for the hardware (e.g. to fill the packet buffer of a receiver). Since errors are expected to occur rarely, it is conceivable that one transputer can control several result analyzers.

Theoretically, one transputer can execute the transmission of test packets by sending each byte out of its local memory 17 in real-time. Practically, however, the transputer would be completely occupied with the transmission of bytes and could not provide any other services, e.g. to give a status report when low priority packets have to be retransmitted because of overload conditions at an output port. The process that generates the test packets has to be finished before the test run is started. Therefore, it is preferred to perform some preprocessing activities which store the test packets in separate memory locations at the transmitter hardware rather than in the local transputer memory. In order to transmit a test packet, the transputer only has to send the memory address of the first byte of the test packet (i.e. the start address) to the transmitter hardware and leave the transmission of the packet to the hardware control logic. This feature reduces the required transmission rate between transputer and transmitter hardware from 8 bytes to 1 byte per high priority packet, and from 32 bytes to 1 byte per low priority packet, respectively, and thus, offers the possibility to control several transmitters by a single transputer.

Figure 12:
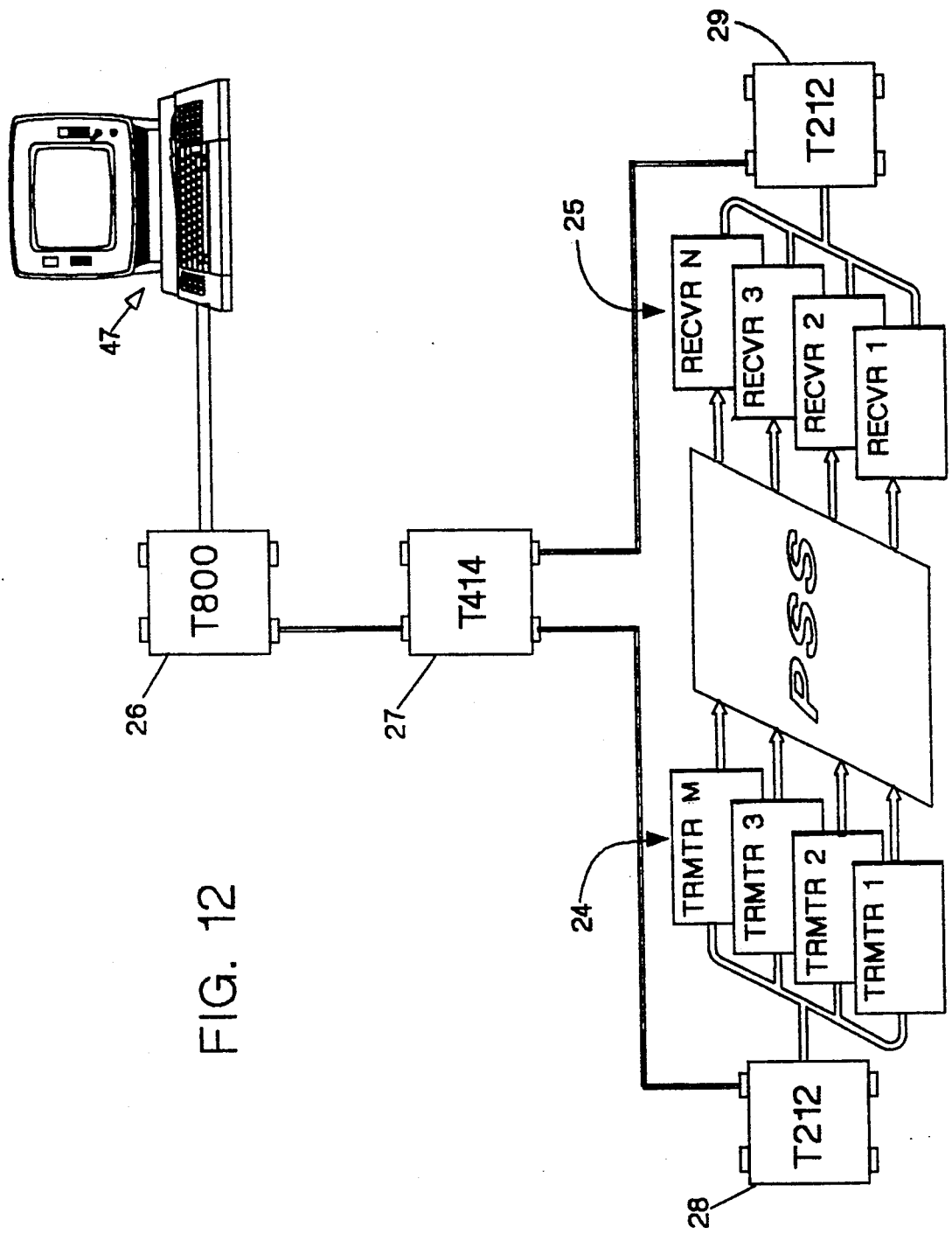
FIG. 12 shows the architecture of the testing-based verification system in accordance with the invention.

As mentioned before, specific hardware in the environment and result analyzer portions 14, 15 is responsible for the execution of all time-critical tasks of the verification system. FIG. 12 shows the architecture of the testing-based verification system in accordance with the invention. The transmitter hardware 24 in the environment portion 14 and the receiver hardware 25 in the result analyzer portion 14 consist of as many autonomous functional units as the switching system has input and output ports. Each functional unit contains the entire set of components to provide an input port with test data, or to analyze the responses of an output port in real time, and for each input port as well as for each output port identical input test resources, and identical output test resources, respectively, are provided.

A port carries the following three signals: the data signal, a packet delimiter signal that indicates when the data signal carries valid data, and the backpressure signal that indicates overload conditions at the port. Only the data signal transmits the high-speed (32 Mbit/s) data. The logic values of the other two signals change with significantly lower frequencies.

The transmitter and receiver units 24, 25 are designed in a way that one transputer can control from one to 16 units. The front end of the transmitter and receiver hardware performs the signal level adaptation to the switching system. The time-uncritical applications of the verification system, namely the global control of the system and the test case generation, are implemented in software on the T800 transputer 26. The T414 transputer 27 serves as communication node between the T800 transputer 26 and the two T212 transputers 28, 29.

The control logic for the transmitter and receiver hardware 24, 25 can be designed as a collection of communicating finite state machines. In one part of the verification system it may be useful to have concurrent processes executed by OCCAM programs and performed by transputers, and in another part, concurrent processes may be designed as finite state machines and implemented in hardware. The design of the hardware control logic as a set of communicating finite state machines contributes to the efforts to form a homogeneous system performing concurrent processes on a multi-transputer network with additional specialized hardware.

Based on the architecture of the verification system shown in FIG. 12, first a description of the functional characteristics of the entire verification system, and then of each of its major components will be given. The Switch Fabric Adapter (SFA, cf. FIG. 5) serves as interface between the external worlds of circuit switched traffic and packet switched traffic, and the internal world of two types of fixed-length minipackets. The actual switching system, the Switch Fabric (SF), operates exclusively on the minipacket traffic. By connecting the verification system directly to the SF, the SF becomes accountable for all observed errors. The SFA, a potential source of errors for the entire switching system, can be excluded because it is not in the verification path.

To perform a successful and comprehensive verification of complex switching systems, several independent levels of verification should be pursued:

The basic functional behavior of the switching system is checked during simple interconnection tests by sending single packets through the system and explicitly checking whether each packet arrives correctly at its destination port. A packet buffer that temporarily stores a fixed number of incoming packets permits a detailed analysis of the received packets during a post-processing phase.

Behavioral tests are performed during continuous test runs with randomly changing traffic mixes and under various loads as thoroughly as practical. This verification mode aims at the detection of transient manufacturing faults and hidden design errors which may occur with a very low probability (even below $10^{-9}$).

Resolution tests provide detailed diagnostics on whether a system satisfies particular requirements.

Performance tests measure the performance characteristics of the switching system under test, such as, e.g. the maximum throughput of the system, or the mean transit delay of successive packets.

Robustness tests are performed to determine how well a switching system under test recovers from various error conditions. The reaction of the system to unusual or invalid input data is of particular interest.

While the nominal clock frequency of the packet switching system was assumed to be 32 MHz, the hardware design of the switch would allow the system to be driven with any lower clock frequency, down to single step mode. In case of a system malfunction, the operation of the system with a slower clock frequency is helpful in detecting whether the malfunction is related to timing problems.

Figure 13:
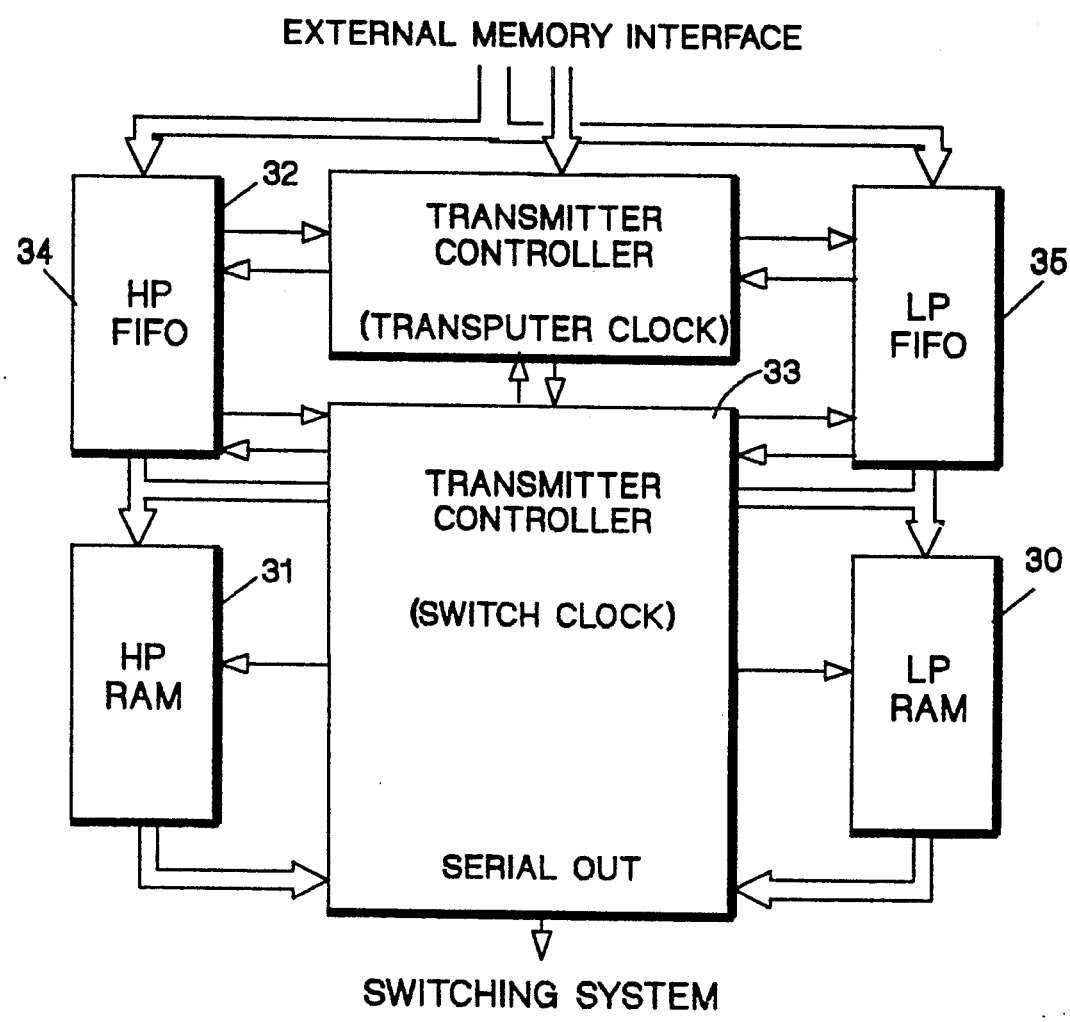
FIG. 13 is a block diagram of a typical transmitter hardware.

The transmitter hardware and its controlling transputer (see FIG. 12) form the environment portion of the verification system. Each transmitter is associated with a specific input port and provides test data for that input port. FIG. 13 shows a block diagram of a typical transmitter hardware.

Since the switching system has to process two different types of traffic with different characteristics, it is natural to store the test packets of high and low priority traffic in separate RAMs. The 8 kbyte RAM 30 can hold 256 low priority packets at maximum ($256 \times 32$ byte=8 kbyte). In order to have the same starting addresses for the high priority packets as for the low priority packets, the high-priority packet RAM 31 is also filled with 256 packets. During one test setup, these 256 different high-priority packets and 256 different low-priority packets represent the stock of available test data.

The following two approaches are recommended for the generation of test traffic with specific characteristics from the stock of prepared packets:

In the so-called transputer mode, the transputer controls the transmission of packets from both priorities in real time. The intervals in which the transputer sends the start addresses of the packets to the transmitter (call-by-address!) determine the timing characteristic of the resulting traffic. Since the transputer network and the switching system are running with different clocks, transputer clock 32 and switch clock 33, FIFO elements 34, 35 are used to support a clean clock separation in the transmitter hardware. Transputer clock 32 controls the writing of the packet addresses into the FIFOs 34, 35, the clock 33 of the switching system controls the reading of the addresses out of the FIFOs 34, 35 and the transmission of the associated packets. Thus, for each type of traffic, a separate RAM 30, 31 (to store the contents of the packets) and a separate FIFO element 34, 35 (to store the addresses of the packets which are sent out next) are provided.

In the retransmit mode, the transmitter hardware controls the transmission of the packets autonomously without any transputer interaction. The information about the desired distribution of the packets over time is loaded into the high-and low-priority FIFOs 34, 35, respectively, during a preprocessing phase. The transmitter control logic permits repetitive reading of the contents of the FIFOs. Pauses are generated in that out of the nine bits the FIFO data bus contains, eight bits are used to address one of the 256 possible packets. A logic high in the ninth bit indicates a pause after the current packet, and the next FIFO entry contains the length of the pause in multiples of 2 $\mu$s (=length of a high priority packet). This feature ensures an efficient use of the memory space of the FIFOs 34, 35. A pause between succeeding frames, independent of its length, requires only one additional FIFO entry.

The time a transputer requires to perform the necessary instructions to send one address byte to the transmitter, and to trigger in this way the transmission of a packet, is at least 300 ns. The transputer first has to load the 8-bit address word (100 ns) and the number of the destination transmitter (50 ns) into its internal registers. It then has to write the address word to the external memory interface (150 ns). Under worst-case conditions (if all attached transmitters have to send high priority traffic with 100% load), a single transputer can serve up to (2 $\mu$s/300 ns=6.67) six transmitters in real time.

Every 2 $\mu$s (the length of a high priority packet) one byte must be written into each transmitter, or each transmitter must be served with 0.5 Mbytes/s. The maximum data rate of the external memory interface is limited to 10 Mbyte/s (80 Mbit/s). These 10 Mbyte/s would be sufficient to serve 20 transmitters with 0.5 Mbyte/s. For a switching system with more than six inputs, therefore, at least a part of the transmitters must be operated in retransmit mode if only one transputer is available. The possibility to switch dynamically between both operation modes, transputer mode and retransmit mode, during a test run emphasizes the flexibility of a setup where some transmitters are running in retransmit mode, and others (not more than six) are operating under real-time control of the transputer.

It will be clear to those skilled in the art that the transmitters required for any verification system, including the one of the present invention, can be built from commercially available integrated circuits and arranged, for example, on a printed circuit board. All finite state machines of the control logic can be implemented in so-called programmable array logic (PAL). These devices typically have a maximum propagation delay of 15 ns and can be clocked up to 50 MHz. All of the (e.g. 10) outputs of each PAL can be reconfigured to act as inputs. Thus, it is possible to define up to 22 inputs. Furthermore, each of the outputs is user-programmable for either registered or combinatorial operation. The number of product terms per output varies between eight and sixteen.

As storage for the test packets, commercially available CMOS static RAM 30, 31 organized as $8K \times 9$ with a maximum access time of 45 ns may be used. The base addresses of the test packets are written into a CMOS parallel-serial FIFO 34, 35 containing a RAM array organized as $4K \times 9$-bit. The parallel port access time is 50 ns, and the device can be clocked up to 40 MHz, allowing asynchronous as well as simultaneous read and write operations.

Figure 14:
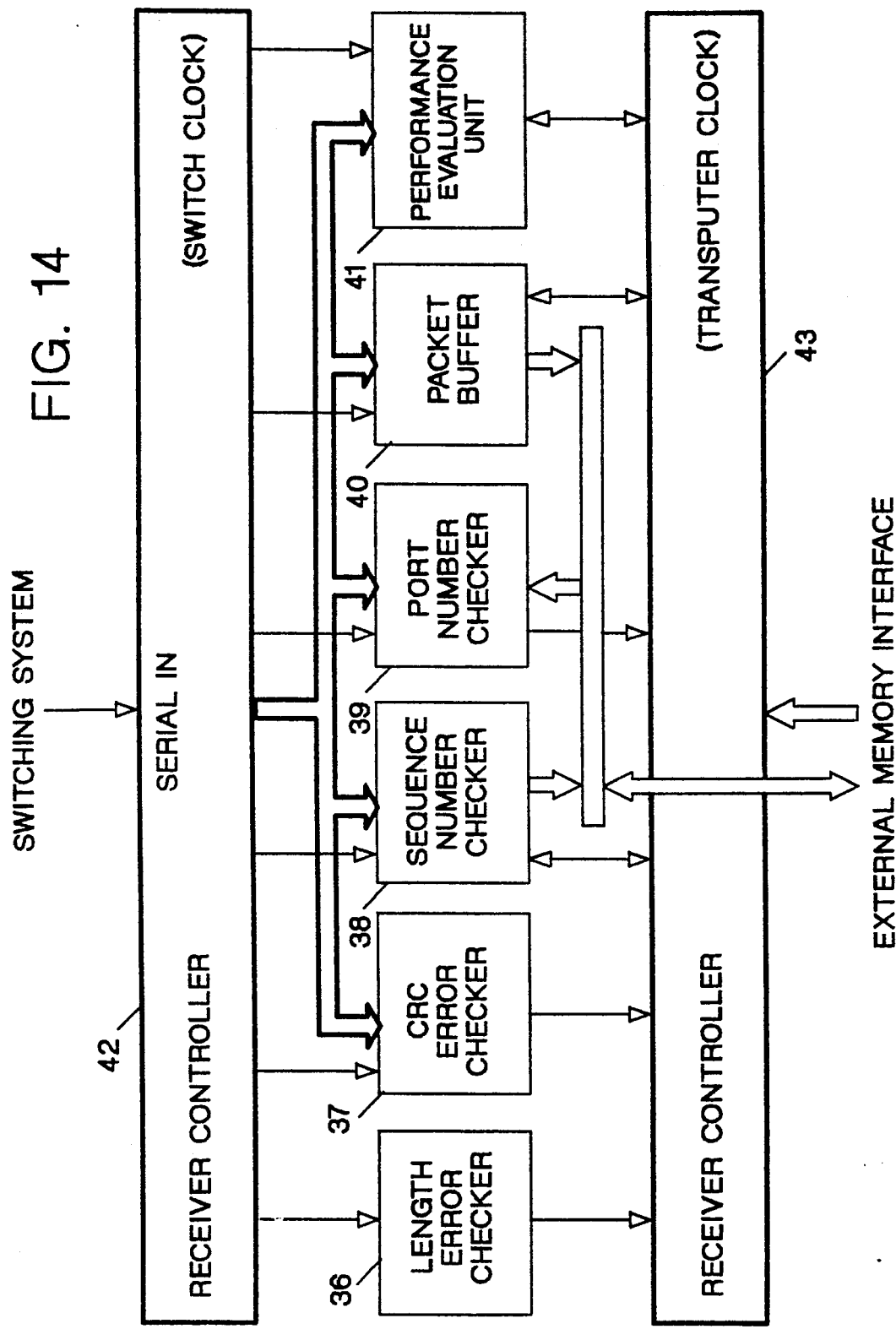
FIG. 14 is a block diagram with the basic components of a receiver.

The receiver hardware and its controlling transputer represent the result analyzer portion of the verification system. Similar to the transmitter hardware of FIG. 13, the receiver hardware consists of a set of identical functional units, called receivers. Each receiver analyzes the data stream of a single output port of the switching system in real time. FIG. 14 is a block diagram with the basic components of a single receiver.

A speed rate of 32 Mbit/s per output port requires a hardware-based evaluation of the output data of the switching system. Different error checkers 36 . . . 39, a packet buffer 40 and a performance evaluation unit 41 form the kernel of each receiver unit. The error checkers 36 . . . 39 are functionally independent blocks which are operating concurrently. Each error checker 36 . . . 39 extracts pertinent information out of the incoming data stream, performs the necessary evaluations, and decides whether a packet has been switched correctly or not. The error checkers 36 . . . 39 are entirely implemented in hardware; they perform all time-critical tasks of the result analysis. A transputer interaction is only required if one or more of the following events occur:
1. At least one error checker 36 ... 39 has detected a malfunction of the switching system during the examination of the data stream.
2. The performance evaluation unit 41 triggers a transputer process which measures the transmission time of packets and performs some additional statistical computations.
3. The user requests status information of the receiver hardware or wants to read the contents of the packet buffer 40.

Since transputer interactions initialized by an error checker 36 ... 39 or by the performance evaluation unit 41 may trigger time-critical tasks, they are handled with a higher priority than a user request for some status information. In order to get a clean separation between the two clocks involved, the control logic for the receiver is split into two independent parts: one unit 42 operating with the clock of the switching system, another unit 43 operating with the transputer clock.

The functional independence of the error checkers 36 ... 39 allows a modular design (i.e., each checker can be designed separately) and a stepwise implementation of the receiver hardware. In the following, the error checkers 36 ... 39 are described in more detail:

The task of the length error checker 36 is to detect packets with incorrect length. The data stream from the switching system is accompanied by a packet delimiter which carries a logic low signal during the transmission of a valid packet. Length error checker 36 extracts the type bit of an arriving packet (which is used to distinguish between a 64-bit high-priority packet and a 256-bit low-priority packet), counts the clock cycles during which the packet delimiter stays low, and decides whether the received packet has a correct length or not.

The task of the cyclic redundancy check (CRC) checker 37 is to detect corrupted packets. The test case generator inserts a 12-bit CRC code at the end of each packet. CRC checker 37 starts with the falling edge of the packet delimiter signal. When the packets arrive without errors, the output of CRC checker 37 transits to logic zero, with the rising edge of the packet delimiter at the end of each packet. If the error output stays at logic one, a CRC error has been detected and is reported to the control logic 42, 43.

The task of sequence number checker 38 is to detect lost packets, packets that arrive in wrong sequence, and duplicated packets. In order to check the correct sequence of packets that originate from the same transmitter source, sequence number checker 38 extracts the sequence number as well as the source address of the packet out of the incoming data stream.

The task of port number checker 39 is to detect packets which are switched to a wrong output. Checker 39 compares the four-bit destination of each packet with a receiver address which has been assigned to each receiver unit during the initialization phase of the verification system.

Figure 15:
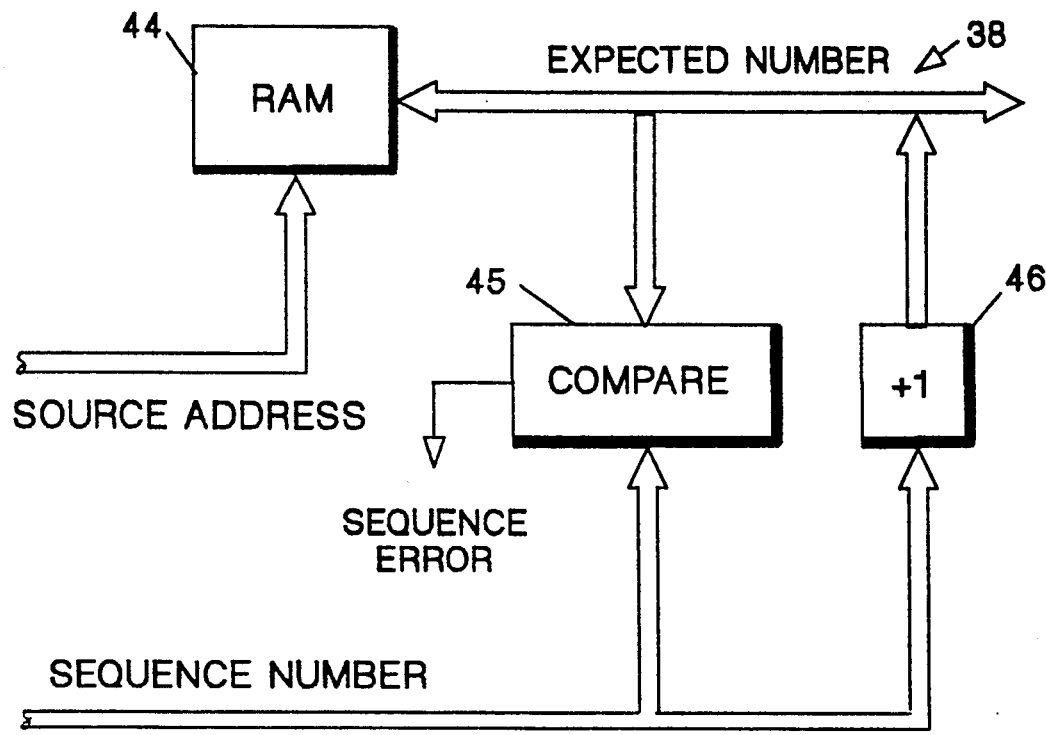
FIG. 15 shows a block diagram of a sequence number checker.

FIG. 15 shows a block diagram of a sequence number checker 38. The source address serves as RAM address under which the expected sequence number of the actual packet is stored in a RAM 44. The expected sequence number is compared (45) with the sequence number extracted out of the packet. If the numbers do not match, an error is reported to the control logic. The extracted sequence number is incremented by one (46) and stored in RAM 44 under the same source address location. The fact that the sequence number that was extracted out of the actual packet is incremented by one ensures that bursts of errors are avoided in case only one packet was lost. Sequence number checker 38 is used to detect the following types of errors: sequence error, packet loss, and packet duplication.

The task of packet buffer 40 is to continuously keep a user-controlled stack of the packets that most recently arrived. The size of the stack may vary from zero to the maximum amount of available memory space of the storage medium. A 4 kbyte FIFO is sufficient to hold between 128 (only low-priority) packets and 512 (only high priority) packets. If a command to fill the FIFO is triggered by an error signal, the FIFO contains sections with pertinent information about the following special periods in time:

Packets which arrived before the fill command was given to the FIFO originate from a period in time where the switching system was operating as expected and no error was observed.

The erroneous packet, that indirectly caused to fill the FIFO, is stored.

Packets which arrived subsequent to the faulty packet fill the rest of the FIFO.

A subsequent examination of packet buffer 40 facilitates the identification of the faulty packet.

The task of the performance evaluation unit 41 is to support the characterization of the dynamic functional behavior of continuously operating high-performance switching systems under various traffic load conditions. The relative transit time between packets, which have been inserted into the switching system back to back at the transmitter, is one significant indicator for the performance of the system. The total transit time $T_{pd}$ for high-priority packets can be composed from the partial times associated with the performance of the individual functional components of the switching system. The time a packet needs to pass the autorouting tree can be neglected, and is, therefore, set to zero. The control logic transmits only entire packets from the SR to the queue element, and it takes 2 µs until a complete high-priority packet appears in the SR. $\delta$ is the time the controller requires to detect a packet in the shift register (SR) and to insert the packet into the output queue; it is 2 µs at maximum. Finally, a packet is delayed in the output queue for the time $T_{Qu}^h$. Thus, $$T_{pd} = 2 \ \mu s + \delta + T_{Qu}^h. \quad [16]$$

The time $T_{Qu}^h$ depends on the actual number of already queued packets (queue length), or in general, on the amount of traffic from other transmitters to this output:

$$T_{Qu}^h = \text{queue length} \times 2 \ \mu s. \quad [17]$$

In case of low priority traffic, the time $T_{BP}$ during which the packet is backpressured (because the output queue is filled) adds to the total transit time $T_{pd}$.

$$T_{pd} = T_{BP} + 2 \ \mu s + \delta + T_{Qu}^l; \quad [18]$$

$$T_{Qu}^l = \text{queue length} \times 8 \ \mu s; \quad [19]$$

As mentioned before, two time bits are inserted into each packet: a start bit and a stop bit. Whenever the performance evaluation unit 41 detects a logic high start bit, a time measurement process in the receiver transputer is triggered via an external interrupt request. The subsequent detection of a logic high stop bit terminates the time measurement process via a second interrupt request. As soon as the transputer has finished some statistical evaluations, it is prepared for the next time measurement and indicates this state to the performance evaluation unit 41.

The relative transit time $T_{rel}$ for back-to-back high-priority packets is influenced by their different queueing times $T_{Qu}^1$ and $T_{Qu}^2$.

$$T_{rel} = T_{Qu}^2 - T_{Qu}^1 + 2 \ \mu s; \quad [20]$$

$T_{Qu}^2$ becomes greater than $T_{Qu}^1$ because in general packets from other transmitters are interleaving the two packets, which carry the active start and stop bits, at the output queue. At the high-priority queue, only high-priority packets may interleave. The relative transit time $T_{rel}$ for high-priority packets is, therefore, expected to be a multiple of 2 μs.

The absolute transit time $T_{abs}$ of the packets is another important indicator for the performance of a switching system. To approximate the absolute transmission time of low priority packets, the time measurement is commenced with the start bit of a high-priority packet, and stopped with the stop bit of a low-priority packet. This procedure does not require any additional link from the transmitter to the receiver.

$$T_{pd} = T_{BP} + 2\mu s + \delta^2 + T_{Qu}^1; \quad [21]$$

$$T_{abs} = T_{pd} - \delta^1; \quad [22]$$

$$\delta^1 < T_{BP} + T_{Qu}^1 \rightarrow T_{abs} \approx T_{pd}. \quad [23]$$

The transmitter is forced to insert a low priority packet immediately after a high priority packet. If no other transmitter sends high priority packets to the output of interest, the delay time of the high priority packet in the output queue can be neglected. The total transit time of the high-priority packet is reduced to $\delta^1$. The point in time at which the high-priority packet starts the time measurement process in the receiver transputer is taken as approximation for the point in time at which the low-priority packet is inserted into the switching system at the transmitter, or, if the uncertainty $\delta^1$ is very small compared to the time the low-priority packet is back-pressured and the time the low-priority packet is delayed in the output queue, then the measured time $T_{abs}$ is nearly the same as the absolute transit time $T_{pd}$.

Each receiver unit may be implemented on a printed circuit board. The FIFO, used as temporary buffer for all received packets, and the RAM 44, used to store the expected sequence numbers of the next incoming packets, are the same devices as used for the transmitter. PALs are used to implement the finite state machines.

The entire software for the global control of the verification system (FIG. 12) and the semi-automatic test case generation are running on a commercially available IMS T800 transputer 36. The Personal Computer (PC) 47 operates as a terminal for data entry (via the keyboard) and data presentation (via the screen). The IMS T414 transputer 27 acts as a communication node between the T800 host 26 and the T212 transputers 28, 29 of the environment and result analyzer portions 14, 15, respectively.

The task to generate test cases is completely independent from the task to perform the verification and characterization of the switching system, and could be implemented separately. In the verification system of the present invention, the semi-automatic test case generator is located at the T800 host transputer. The test case generator is a kind of interface between the test method and the part of the verification system that performs the system evaluation. Its main tasks are to support the user during the specification of abstract test cases, and to compile the abstract test cases into executable test cases suitable for the verification system.

Figure 16:
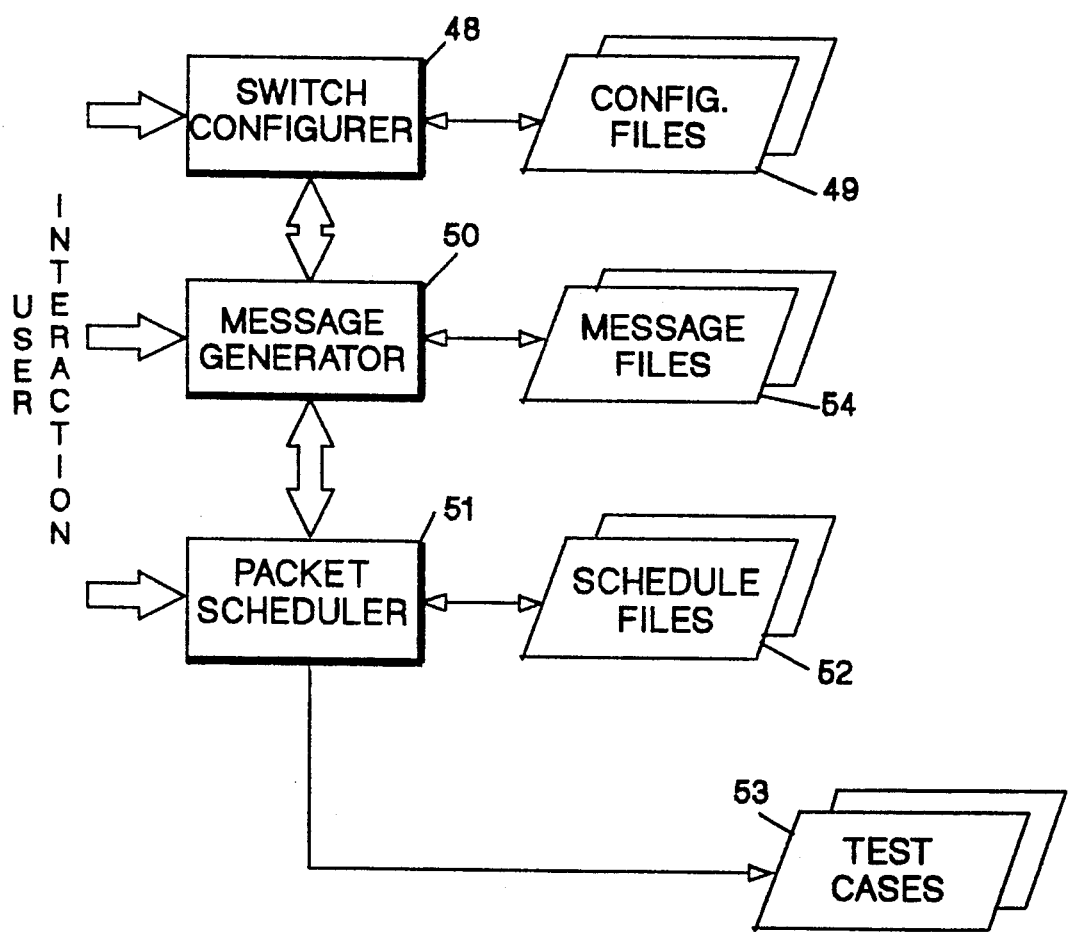
FIG. 16 shows the different sources used for the test case generation.

At the system level of abstraction, test cases for fast packet switching systems consist of sequences of test packets with different priorities, simultaneously sent under various loads from several inputs to several outputs of the switching system. The following three independent applications controlled by user interactions are used to generate the required executable test cases. FIG. 16 shows the different sources used for the test case generation.

A Switch Configurer 48 is used to specify the physical configuration of the switching system to the test case generator. A Config file 49 contains the total number of inputs and outputs, the number of stages the entire switching system comprises, and the routing information on how all these stages are interconnected. Config file 49 is used by a Message Generator 50 to place the output address (or addresses in case of a multistage system) of a packet at its correct position inside the test packet.

Message generator 50 receives inputs relative to the assumed fault path for which the test packets are generated, the traffic priority, and the name of the relevant configuration file. Based on these inputs, a message is produced which contains all required information to detect the system errors described as "Target Errors". A message is defined as a sequence of packets, all originating at the same input and intended for the same output. Message generator 50 determines the contents of the test packets, and thus also the contents of the RAMs 30, 31 in the transmitter units 24.

Figure 17:
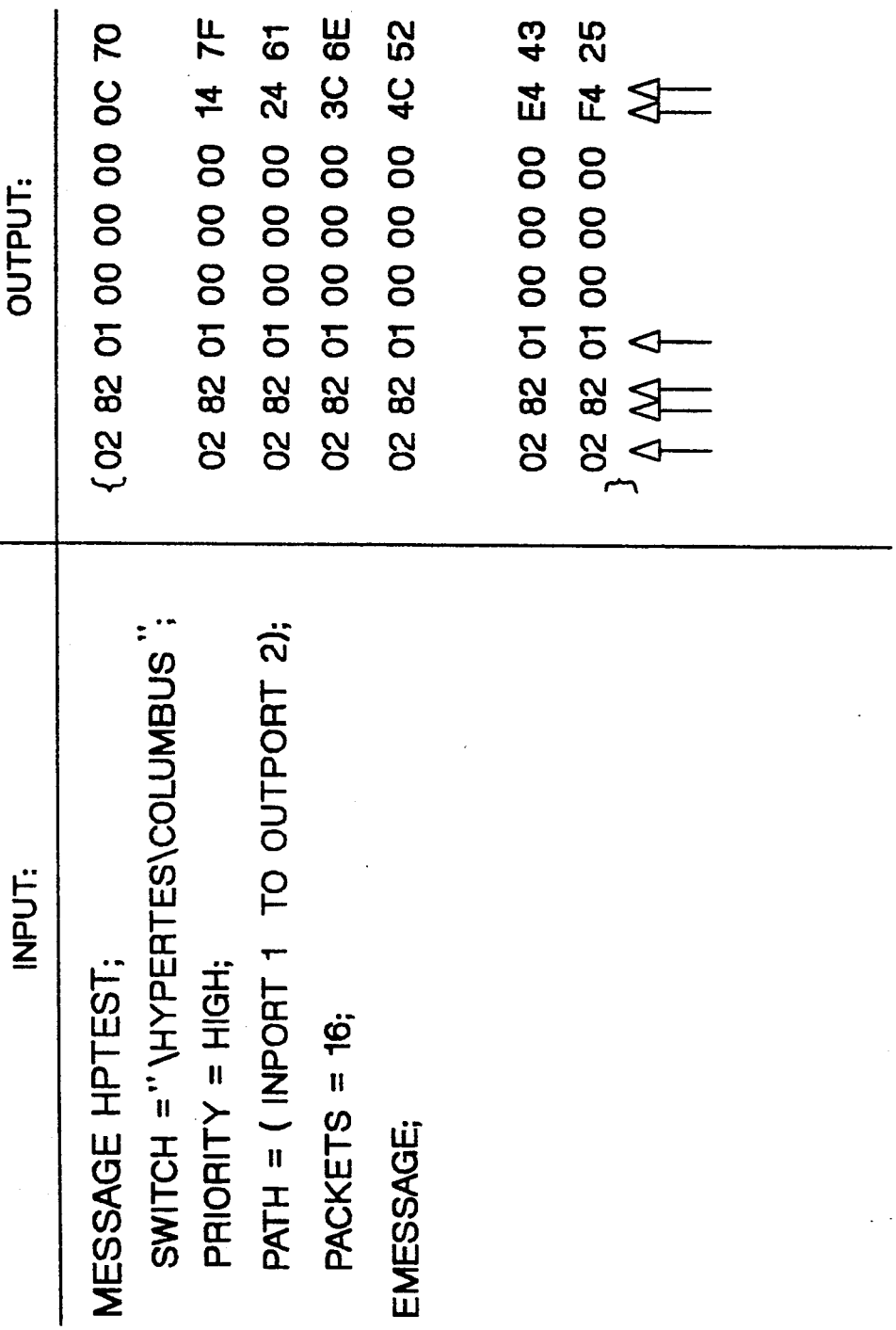
FIG. 17 illustrates a message consisting of 16 test packets.

An example of how message generator 50 compiles the formal notation of a specific test path in a specific switching system into a message consisting of 16 test packets is shown in FIG. 17. High-priority test packets have eight bytes represented by eight pairs of hex-characters. The first and third arrow in FIG. 17 (the arrows are ordered from left to right) point to the destination address of the packet (outport 2). The "8"-character in the column of the second arrow indicates high-priority packets. The fourth arrow points to the source address of the packets (inport 1). The last but one arrow points to the sequence number of the packets, and finally the last arrow points to the 12-bit CRC code.

The task of packet scheduler 51 is to schedule the packets of several messages in a way that a certain load and a certain mix between high- and low-priority packets is established. Basically, packet scheduler 51 generates ordered lists of addresses which are loaded to the appropriate FIFOs 34,35 (FIG. 13) and used to call out the packets from the respective RAM 30, 31. The task of the environment is to ensure that the precalculated test packets are applied to the switching system in the same manner as it is specified in a schedule file 52. The test case file 53 is the end product of the test case generation representing the executable test cases. The contents of this file 53 can directly be loaded into the transmitter hardware.

The config, message, and schedule files 49, 52, 54 containing the abstract representation of the test cases can be regarded as library files. The completeness of these libraries determines the entry point for the user interaction during the semi-automatic test case generation. For example, if there already exist configuration files for all possible switch configurations, the user can directly start the test case generation at message generator 50.

- A new fault model (called the Path Fault Model) is being proposed to describe functional misbehaviors of packet switching systems at the system level of abstraction. The fault model does not restrict the number of simultaneously active faults in a system, and considers also transient system defects which may occur with error probabilities even below $10^{-9}$. Describing packet switching systems at the system level of abstraction with paths and packets, and regarding the paths as functional primitives responsible for a misbehavior of the system, reduces the number of potential errors and, thus, makes a subclass of sequential systems amenable for verification approaches.

- Based on the Path Fault Model is the test method for fast packet switching systems in accordance with the present invention. The central idea of the test method is to insert all information which is required and sufficient to decide, —at the output side of the switching system, —whether a packet has been handled correctly or not, into the payload part of each test packet.

- To enable the performing of the formal test method in accordance with the invention, a multi-processor-based implementation of a verification system is proposed to verify and characterize the integrated switch fabric of fast packet switching systems in real-time. The preferred implementation consists of four transmitter units and one receiver unit. Each unit is able to process (send or analyze) a continuous data stream of 32 Mbit/s in real-time.

- An existing information theoretic approach to test complex systems by statistical means has been adapted to the peculiarities of packet switching systems. The approach delivers an approximation for the test period one has to offer in order to reach a certain degree of confidence that the probability of the system to fail does not exceed a certain upper bound.

- A formal notation for abstract test cases has been defined for fast packet switching systems. These abstract test cases are automatically transformed into executable test cases which can be processed with the preferred implementation of the verification system.

- The detailed system verification permits the statement that the integrated switch fabric is free (with a remaining error probability for the system to fail of less than $10^{-10}$) or design and manufacturing errors, and that the actual operational behavior of the system conforms to that established in the specification.

The conceptual approach to describe packet switching systems with paths and packets at the system level of abstraction (Path Fault Model) is applicable to packet switching systems in general and is not restricted to fast packet switching systems only. The proposed test method, viz. to insert all information required to determine, —at the destination of the packet—whether or not it has been handled correctly, assumes that there is sufficient space in the payload part of each packet to insert the CRC code, the sequence number, the input address, and the time-bits. The 48 byte payload size of an ATM cell that will become an industry standard, offers the possibility to insert even further information, like an entire time stamp for performance measurements, in each packet.

The proposed choice of a transputer network as framework for the architecture of the verification system offers the possibility to extend the system easily in terms of additional transmitter and receiver units. While the architecture of the transmitter and receiver units of the preferred embodiment is strictly oriented towards fast packet switching systems, with the integrated switch fabric being designed to support two different types of traffic, namely data traffic with 32 byte long packets, and voice traffic, which is handled with priority and which consists of 8 byte long packets, other packet lengths with or without priority and other types of traffic (e.g. that appropriate for ATM Switches) can be supported if appropriate adaptations in the architecture of the system environment (transmitter) and in the result analyzer (receiver) are made.

Principally, the behavior and resolution tests are performed under traffic patterns which consist of repetitive cycles of a specific packet sequence. If it turns out that specific statistical distributions are desirable or required, further adaptations have to be made either directly at the transmitter hardware or at the transputer software.

The specification of the integrated switch fabric indicates 32 Mbits/s as nominal speed rate per port. This enables the entire control logic of the transmitter and receiver hardware to be designed as concurrent finite state machines, and these are implemented in programmable array logic (PAL) devices. The maximum clock frequency up to which the presently available PALs operate correctly is 50 MHz. Although the 50 MHz are beyond the currently required 32 MHz, the next generation of high-performance fast packet switching systems will certainly have to support data rates above 100 Mbits/s per line. In order to achieve such high data rates, several adaptations of the controller hardware are required. One possibility is to use a faster technology to implement the finite state machines, for example emitter-coupled logic (ECL). Another solution is perhaps to work with larger word widths in order to thus reduce the number of required memory accesses.

One task of the global controller is to connect the transmitter (or environment) portion of the verification system with the receiver (or result analyzer) portion. During operation, a special event on the receiver side (for example, an observed error) can force an interaction at the transmitter side via the global controller (for example, an interrupt of the transmission). Compared to the data flow from the transmitter to the receiver via the switching system (i.e., the verification path), the data exchange between global controller on one side, and transmitter and receiver on the other side can be neglected.

Practically, if the transmitter is assumed to operate in retransmit mode, once transmitter and receiver are initialized in a preprocessing phase, they operate autonomously without interaction required from the global controller. Therefore, it is conceivable to place the transmitter and receiver portions at geographically distant locations of a fast packet switching network, and to have, thus, a formal basis to verify and characterize Metropolitan Area Networks (MANs) and even Wide Area Networks (WANs). It is believed that with the increasing complexity and line speed of telecommunication systems, the necessity to have formal approaches to verify and characterize the dynamic functional behavior of geographically distributed switching nodes and networks appears to become more and more indispensable.

It is also conceivable to integrate the verification system of the present invention into existing switching systems. The motivation to do this is to verify and characterize the behavior of these systems under normal operating conditions. Where transmitter and receiver units are distributed to different locations of the switching network, and the special addresses of the receiver units in the network are known to the transmitters, the latter periodically send an adjustable load (the load should be made adjustable depending on the utilization of the network) to the receivers and perform thus a partial verification and characterization of the network during regular operating conditions. What is claimed is:

We claim:

1. Method for testing and evaluating the dynamic functional behavior of geographically distributed telecommunication networks, in particular fast packet switching networks constructed of primitive functional building blocks comprising a plurality of transmitting stations, and receiving stations, each station containing a transputer having its own memory and transmitting receiving hardware and control software, and communication links connecting those stations for the transmission of traffic organized in the form of packets, wherein the packets each contain a control block and a payload portion, the latter being devoted to carrying the normal user information, characterized by the following steps:
   defining the primitive functional building blocks, including paths of transmission, between the inputs and outputs of the network,
   defining a set of target errors which the testing and evaluation is to detect,
   passing, during a testing and evaluation phase and/or during normal operation of the network, test packets around the network which contain, in their payload portion all information relevant to their testing and evaluation task, instead of the said normal information usually contained in said payload portion, and
   analyzing the test packets arriving at the output port of their said path of transmission for any unexpected results.

2. Method in accordance with claim 1, characterized in that:
   said information relevant to the testing and evaluation task of the test packets and contained in the payload portion of the test packets comprises at least an input address, a sequence number, time bits, and a cyclic redundancy check (CRC) code;
   wherein, said input address defines the source of said test packet, said sequence number indicates the order in which said test packets are sent out from a particular source, and said time bits define the transmission delay of said test packet through said network, and said CRC code insures the correctness of the entirety of said information contained in said control block in said payload portion of said test packet.

3. Method in accordance with claim 1, characterized in that:
   the information contained in the control block of the packets at least encompasses an output address and a type bit, said output address defining the destination of said packet, said type bit indicating the priority level associated with said packet.

4. Method in accordance with claim 1, characterized in that:
   said set of target errors is defined to comprise at least two of the following: packet loss, packet duplication, packet arrival in wrong sequence, packet arrival at wrong output, packet arrival with wrong packet length, corrupted packet contents, wrong packet delay.

5. Method in accordance with claim 4, characterized in that:
   the contents of said control block and payload portion of said test packet are considered to test said network for one or more of these errors:
   sequence number and input address for the determination of packet loss, packet duplication, and packet arrival in wrong sequence;
   output address for the determination of arrival of a test packet at a wrong output;
   type bit for the determination of a packet arriving with a wrong packet length;
   time bits for the determination of a packet arriving with a wrong packet delay; and
   CRC code for the determination of a packet arriving with corrupted packet contents.

6. Method in accordance with claim 1, characterized in that:
   sequences of test packets are simultaneously sent from several input ports to several output ports, whereby the traffic load conditions are varied between any two successive transmissions of test packets.

7. Method in accordance with claim 1, characterized in that:
   said test packets prior to their transmission are stored in separate memory locations of said transputer at a said transmitting station, and that, to enable said test packets to be transmitted at a reduced transmission rate, said transputer of said transmitting station sends the memory address of the first byte of said test packet to the transmitting station's hardware, and that the actual transmission of said test packet is performed by the transmitting station's hardware control logic.

8. Method in accordance with claim 1, characterized in that:
   the test packets have a fixed length determined by the type of traffic with which they are associated; for high-priority voice traffic said test packet length is 8 bytes, whereas for low-priority data traffic said packet length is 32 bytes.

9. Method in accordance with claim 1, characterized in that:
   said test packets have a fixed length determined by the type of traffic with which they are associated; for high-priority voice traffic said test packet length is 8 bytes, whereas for low-priority data traffic said packet length is 53 bytes.

10. Verification apparatus for testing and evaluating the dynamic functional behavior of geographically distributed telecommunication networks, in particular fast packet switching networks comprising pluralities of transmitting stations and receiving stations and communication links connecting those stations for the transmission of traffic organized in the form of packets, characterized in that:

said apparatus comprises a system environment portion including a plurality of transmitters associated each with an input port of the packet switching network to be tested, and a result analyzer portion including a plurality of receivers, each respectively associated with one of the output ports of said packet switching network, and a global controller and test case generator connected to each said transmitter and receiver for managing their interconnection and for generating and supplying test cases thereto.

11. Verification apparatus in accordance with claim 10, characterized in that:

said transmitters and said receivers are designed as transputers wherein one transputer is individually associated with each input port and with each output port of the network to be tested, that a first control transputer is connected to the inputs of all transputers on the transmitter side, that a second control transputer is connected to the inputs of all transputers on the receiver side, and that said global controller comprises a personal computer for user interaction, and a third control transputer for the overall control of the apparatus and/or the test case generation.

12. Verification apparatus in accordance with claim 11, characterized in that:

said transputers of said transmitters comprise a first random-access memory (30) associated with low-priority traffic, and a second random-access memory (31) associated with high-priority traffic, that each of said memories (30, 31) is respectively connected with a first-in-first-out buffer (35, 34), that a first transmitter controller (32) is connected to said buffers (35, 34) for providing a transputer clock signal, and that a second transmitter controller (33) is connected to said buffers (35, 34) and to said memories (30, 31) for providing a switch clock signal and a serial output signal to the packet switching network to be tested.

13. Verification apparatus in accordance with claim 11, characterized in that:

said transputers of said receivers comprise a first switch clock-controlled receiver controller (42) having a serial input connected to the associated output port of the packet switching network to be tested and having parallel outputs respectively connected to a plurality of error checkers (36 . . . 39) each dedicated to at least one of a set of predetermined target errors, to a packet buffer (40) and to a performance evaluation unit (41), and that the outputs of said error checkers (36 . . . 39), said packet buffer (40), and said performance evaluation unit (41) are connected to the inputs of a second transputer clock-controlled receiver controller (43) connected in turn to an external memory interface (23).

* * * * *